US006686946B2

United States Patent
Masuda et al.

(10) Patent No.: US 6,686,946 B2
(45) Date of Patent: Feb. 3, 2004

(54) DENSITY UNEVENNESS SUPPRESSING IMAGE FORMING APPARATUS AND METHOD

(75) Inventors: Koji Masuda, Ohta-ku (JP); Kazuyuki Shimada, Ohta-ku (JP); Tetsuro Saitoh, Ohta-ku (JP); Masahiro Ito, Ohta-ku (JP); Katsuyuki Kitao, Ohta-ku (JP); Tomoya Ohsugi, Ohta-ku (JP); Hirokatsu Suzuki, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 212 days.

(21) Appl. No.: 09/984,236

(22) Filed: Oct. 29, 2001

(65) Prior Publication Data

US 2002/0051052 A1 May 2, 2002

(30) Foreign Application Priority Data

Oct. 27, 2000 (JP) .................................. 2000-329129

(51) Int. Cl.[7] .................................................. B41J 2/435
(52) U.S. Cl. .................................. 347/236; 347/246
(58) Field of Search ............................. 347/236, 237, 347/238, 246, 247, 240, 253; 378/34; 345/63

(56) References Cited

U.S. PATENT DOCUMENTS

| 5,949,844 A | * | 9/1999 | Watanabe ................. 378/34 |
| 6,381,057 B1 | | 4/2002 | Itabashi .................... 359/204 |
| 6,400,391 B1 | | 6/2002 | Suhara et al. ............. 347/244 |
| 6,429,956 B2 | | 8/2002 | Itabashi .................... 359/204 |
| 6,456,314 B1 | | 9/2002 | Masuda ..................... 347/244 |
| 6,469,772 B1 | | 10/2002 | Itabashi ...................... 355/47 |
| 6,473,062 B1 | * | 10/2002 | Debiez et al. ............... 345/63 |
| 6,476,551 B1 | | 11/2002 | Osawa et al. .............. 313/506 |
| 6,505,014 B2 | | 1/2003 | Aoki et al. ................... 399/55 |
| 6,507,720 B2 | | 1/2003 | Kabumoto et al. ......... 399/258 |
| 6,542,707 B2 | | 4/2003 | Muramatsu et al. ........ 399/258 |
| 6,596,985 B2 | | 7/2003 | Sakai et al. ................ 250/234 |
| 6,597,883 B2 | | 7/2003 | Muramatsu et al. ........ 399/258 |
| 6,597,884 B2 | | 7/2003 | Miyaguchi et al. ......... 399/266 |

FOREIGN PATENT DOCUMENTS

JP          10-12516    *   1/1998    ........... H01L/21/27

* cited by examiner

*Primary Examiner*—Hai Pham
(74) *Attorney, Agent, or Firm*—Oblon, Spivak, McClelland, Maier & Neustadt, P.C.

(57) ABSTRACT

An image forming apparatus includes a light emitting array composed of a plurality of light emitting elements that emits light fluxes. An imaging element array may be provided so as to perform imaging with the light fluxes on a prescribed plane. A three dimensional exposure intensity distribution of the light flux is obtained per each light emitting element. A prescribed attribute is obtained from each of the exposure intensity distributions. A plurality of comparison values for the entire exposure valid region may be obtained from different units which consist of two or more successive attributes. Prescribed light emitting quantities enabling all of the comparison values to fall within a prescribed range may be determined and set to respective light emitting elements.

25 Claims, 33 Drawing Sheets

SCHEMATIC DIAGRAM OF INSPECTION APPARATUS FOR IMAGING ELEMENT ARRAY

CROSS SECTION DIAGRAM OF LED

SCHEMATIC DIAGRAM OF LED ARRAY

SCHEMATIC DIAGRAM OF ROD LENS ARRAY

PC MEMBER ROTATIONAL DIRECTION (ORTHOGONAL DIRECTION TO ALIGNMENT)

LED ALIGNMENT DIRECTION (ALIGNMENT DIRECTION)

● LED 1 PIXEL : LIGHT EMITTING STATUS
○ LED 1 PIXEL : NON-LIGHT EMITTING STATUS

1 ON 2 OFF VERTICAL LINE IMAGE

EXEMPLARY EXPOSURE INTENSITY DISTRIBUTION AT
A CROSS SECTION IN AN ALIGNMENT DIRECTION

INCLINATION OF APPROXIMATED STRAIGHT LINE
OF EXPOSURE WIDTH (PSF) AT A CROSS SECTION
IN AN ALIGNMENT DIRECTION

PATTERN DIAGRAM SHOWING CORRESPONDENCE OF
APPROXIMATED STRAIGHT LINE TO VERTICAL LINE (DARK)

PATTERN MODEL DIAGRAM SHOWING CORRESPONDENCE OF APPROXIMATED STRAIGHT LINE TO VERTICAL LINE (THIN)

EXPOSURE WIDTH AT A CROSS SECTION
IN AN ALIGNMENT DIRECTION

Δi OF EXPOSURE AREA

1 ON 2 OFF SIDE LINE IMAGE

INCLINATION OF APPROXIMATED STRAIGHT LINE
OF EXPOSURE WIDTH (PSF) AT A CROSS SECTION
IN AN ORTHOGONAL DIRECTION TO ALIGNMENT

INTEGRATED VALUE OF EXPOSURE VALUES MORE THAN THRESHOLD

Δi OF EXPOSURE AREA WHEN DEFOCUSED

CONFIGURATION OF LIGHT EMITTING VALUE CONTROL APPARATUS

FLOWCHART OF FIRST CONTROL EXAMPLE

MUTUAL RELATION CURVE OF FIRST CONTROL EXAMPLE

ATTRIBUTES WITH REGARD TO CORRECTION VALUE

INCLINATION (Huvw) OF APPROXIMATED STRAIGHT LINE

FLOWCHART OF SECOND CONTROL EXAMPLE

CHANGE IN EXPOSURE INTENSITY DISTRIBUTION
WITH REGARD TO CORRECTION VALUE

MUTUAL RELATION CURVE OF SECOND CONTROL EXAMPLE

FLOWCHART OF THIRD CONTROL EXAMPLE

ATTRIBUTES RANGE THAT LIGHT EMITTING
ELEMENT (k) MUST TAKE

CORRECTION VALUE WITH REGARD TO
IMAGE FORMATION CONDITION

WRITE UNIT EMPLOYING A ROD LENS ARRAY

DENSITY UNEVENNESS SUPPRESSING IMAGE FORMING APPARATUS AND METHOD

CROSS REFERENCE TO A RELATED APPLICATION

This application claims priority under 35 USC §119 to Japanese Patent Application No. 2000-329129 filed on Oct. 27, 2000, the entire contents of which being herein incorporated by reference.

BACKGROUND OF THE INVENTION

1. Field of the Invention

The present invention generally relates to optical writing units which perform optical writing, methods for driving the optical writing unit, image forming apparatuses such as printers, copiers, facsimiles, etc., which employ the optical writing unit, and inspecting apparatuses which inspect the optical writing unit. In particular, the present invention relates to optical writing units capable of suppressing density unevenness in an image formed by the image forming apparatus.

2. Discussion of the Background

Recently, based on the minimization of a digital image output instrument such as a digital copier, a printer, a digital facsimile, etc., an optical writing unit for digital writing use has been necessitated to be minimized. Such digital writing methods can be roughly categorized in to two at the moment. One is a light scanning system that performs scanning a light flux irradiated from a light source such as a semiconductor laser or similar devices using a light deflecting device and forms a light spot by means of a scan imaging lens. The other is a solid writing system that includes and uses an imaging element array so as to form a light spot of a light flux irradiated from a light emitting element array such as one of an light emitting diode (LED) array and an organic EL array made by LEDs aligned.

In the former light scanning system, since the light deflector scans a light, an optical path length becomes longer. In contrast, in the latter solid writing system, since the optical path can extremely be short, there exists an advantage such as compact optical writing unit.

On the other hand, in the solid writing system that includes the light emitting element array having a plurality of light emitting elements and imaging element array, unevenness of a light emitting quantity of the plurality of light emitting elements and that of a shape of the imaging element array may create unevenness of a light spot on an image carrier (e.g. photo-conductive member). Such unevenness can be related to rigidity, a position, and a spot radius. Owing to the unevenness, unevenness of density arises in an image output by an image forming apparatus that employs such an optical writing unit as an exposure unit. As a result, a fine image is hardly obtained.

To obtain a fine image by suppressing the unevenness of the density, a conventional optical writing unit proposes to extend corrections such as any one of light quantity constant correction that enables an emission light quantity irradiated from each light emitting element to the PC member to have a constant value, and spot radius constant correction that enables an optical spot formed on the PC member to have a constant radius at given threshold. For example, Japanese Patent Application Laid Open Nos. 2-62257, 4-305667, and 11-227254 propose such light quantity constant correction and spot radius constant correction, and are known as prior arts.

Among these, the first prior art intends to uniformize an LED light emission quantity by controlling a driving time period for each LED based upon unevenness of a generated light value per each LED dot. The above-described second prior art intends to suppress unevenness of focal depth of a lens array and that of an print density caused by difficulty in packaging of an LED chip with a light quantity adjusted LED head that enables a spot width of an quantity of light to be constant at a given threshold. In addition, it is described in the above-described third prior art that a characteristic point in a light emission intensity distribution of a light emitting element is measured (detected), and light quantity correction data used for energy supply to the light emitting element is determined based upon the characteristic point. Also described is that assumed light quantity correction data is determined based upon unevenness of the light quantity and is corrected based upon the characteristic point, so that the light quantity correction data is determined. In addition, as the characteristic point, changes in a peak position, a peak value, and light emission radius are exemplified.

The light quantity constant correction is a correcting method for measuring an emitted light quantity irradiated from each light emitting element to a PC member with a light quantity measurement device, and changes a current amount supplied to each light emitting element, thereby setting a prescribed supply current amount enabling the emitted light quantity to be constant. The current supply amount is generally controlled by four bits of light quantity correction data, and the light emitting quantity is set at a precision of a few percentages error even admitting that the light quantity is constant in the present circumstances. On the other hand, the spot radius constant correction is a correction method for measuring a light spot radius formed on the PC member with a spot radius measurement device, and changing and setting a prescribed amount of a current that is supplied to each light emitting element and thereby enabling the spot radius to be constant. Since, as same in the above stated light quantity constant correction, the current supply amount is again controlled by four bits, there exists a limit on a controllable amount even admitting that the spot light radius is constant.

In addition, the third prior-art proposes that a light spot radius (Wi) of each light emitting element is measured. Then, it is determined if the light spot radiuses (Wi) represent upward convexity in a graph (not shown) when the light quantity constant correction is only performed using assumed light quantity correction data. The assumed light quantity correction data input to the light emitting element of No. (i) is corrected if the upward convexity appears.

However, the below-described problems generally exist in such a system.

First, assumed light quantity correction data is corrected only in a section that meets the above-described determination. Accordingly, optimization can not be performed over the entire valid image region. Specifically, another section not meeting the determination remains a condition made by the light quantity constant correction.

Second, according to the assumed light quantity correction data correcting system, the assumed light quantity correction data is corrected in accordance with unevenness (Wbi) from the average value (Wave) of (Wi). As a result, it simply performs the spot radius constant correction.

Accordingly, such a proposal shows the light quantity constant correction at a section and the spot radius constant correction at another section, and simply makes combination of light quantity and spot radius constant corrections. In addition, even admitting being constant, there exists a limitation on a controllable value as in the above-described light quantity and spot radius constant corrections.

Thus, according to these light quantity and spot radius constant corrections, each of a light quantity and a spot radius is only converged to a resolution level (i.e., 4 bits) of a current supply amount as correction data. As a result, since it is intended to mostly approximate a prescribed target value, a value obtained after performing one of these constant corrections for each light emitting element should vary at around the prescribed value.

Accordingly, the light quantity or the spot radius of each light emitting element is independently set, and remaining light emitting elements are not taken into account.

Improving a limit of resolution level of correction data can be achieved, for example, from conventional 4 bits to either 6 or 8 bits, to approximate the prescribed value. However, the improvement in the resolution limit causes an increase in data values, and requires increase in data transfer speed, thereby resulting in a cost increase.

SUMMARY OF THE INVENTION

Accordingly, an object of the present invention is to address and resolve the above and other problems and provide a new reference voltage generation circuit. The above and other objects are achieved according to the present invention by providing a novel image forming apparatus that includes a light emitting array composed of a plurality of light emitting elements that emits light beams, and an imaging element array that performs imaging with the light beam on a prescribed plane. A three-dimensional exposure light intensity distribution may be obtained per a light beam on the prescribed plane. A prescribed attribute may be obtained from the three dimensional exposure intensity distribution. A comparison value may be obtained from a unit of successive two or more attributes. The light emitting elements may be controlled so as to emit a light beam having a prescribed quantity that enable all of the comparison values for the entire exposure valid region to fall within a prescribed range.

In yet another embodiment, the attribute is an exposure width at a prescribed threshold in a cross section of the three-dimensional light intensity distribution. The cross section may be directed in either a light emitting element aligning direction or its orthogonal direction.

In yet another embodiment, the attribute is either an exposure width of a two dimensional light intensity distribution or an exposure area obtained by accumulating light intensities of the three dimensional light intensity distribution in either a light emitting element aligning direction or its orthogonal direction.

In yet another embodiment, the comparison value is either an inclination of an approximation linear line or a unit exposure area average obtained from a plurality of attributes.

In yet another embodiment, the imaging element array extends over the entire valid image region and is integrally molded.

In yet another embodiment, a positional relation adjusting device may be provided so as to adjust a positional relation between the light emitting element array and the imaging element array so that all of the comparison values for the entire exposure valid region to fall within a prescribed range.

In yet another embodiment, the positional relation adjustment is performed by displacing the imaging element array toward a defocus position.

In yet another embodiment, a computing and processing device determines a light emitting quantity, and each of the light emitting elements is driven based upon the light emitting quantity.

In yet another embodiment, the computing and processing device may find an attribute from a correlation of a correction value, i.e., a light emitting quantity, and its resultant attribute per a light emitting element.

In yet another embodiment, the computing and processing device may determine a range of attributes that the next light emitting element must take based upon one or more preceding known attributes of light emitting elements.

In yet another embodiment, the computing and processing device may determine the light emitting quantity of each of the light emitting elements based upon a correction value.

In yet another embodiment, a prescribed light emitting quantity that enables all of the comparison values to fall within the prescribed range is determined and set to each of the light emitting elements.

In yet another embodiment, an inspecting apparatus may be provided so as to inspect an optical writing unit or an imaging element array by inspecting if all of the comparison values fall within the prescribed range.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1B:
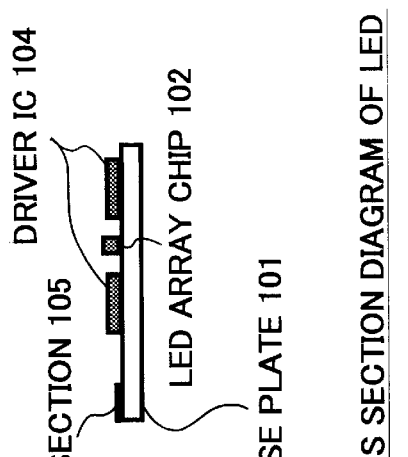
FIG. 1 is a chart for illustrating one embodiment of a light emitting array according to the present invention.
Figure 1C:
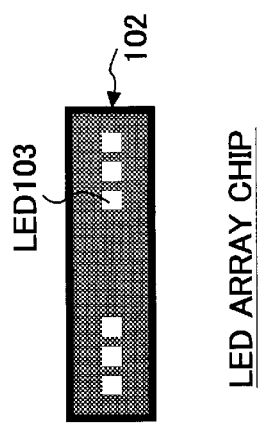
Figure 1A:
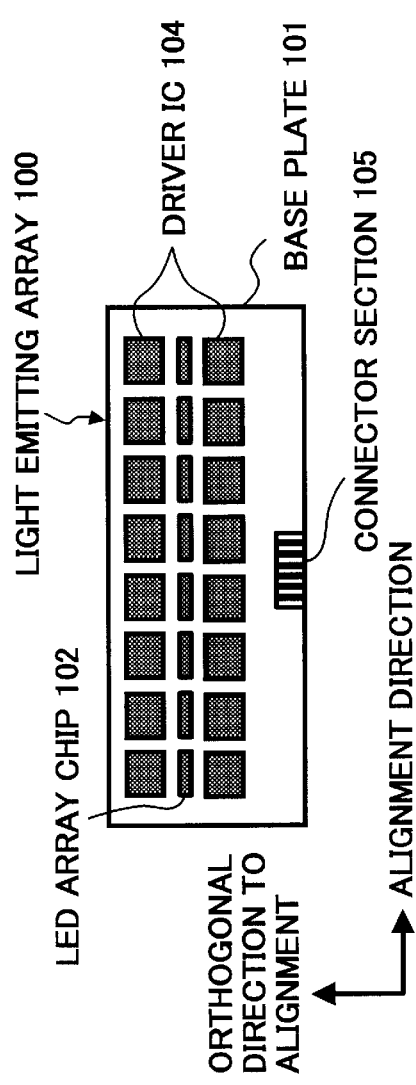

Referring now to the drawings, wherein like reference numerals designate identical or corresponding parts throughout several views, in particular, in FIGS. 1(a) to (c), the light emitting element array 100 may include a light emitting diode (LED) array. The LED array may amount from dozens to around one hundred of diode array chips 102 on a baseboard 101. On the light emitting diode array chip 102, from dozens to several hundreds of light emitting diodes 103 may be arranged. The light emitting elements may be arranged in the present circumstances in a density of 300 to 1200 items per inch, and in this embodiment, the LED array in which the light emitting elements are arranged in a line by 42.3• m (i.e., 600 dpi) pitch is utilized. In addition, a driver IC 104 for driving the LED 103 and a connector section 105 for connecting a signal line capable of passing a data signal such as an external image signal or the like are mounted on the baseboard 101 beside the LED array chip 102.

Figure 2:
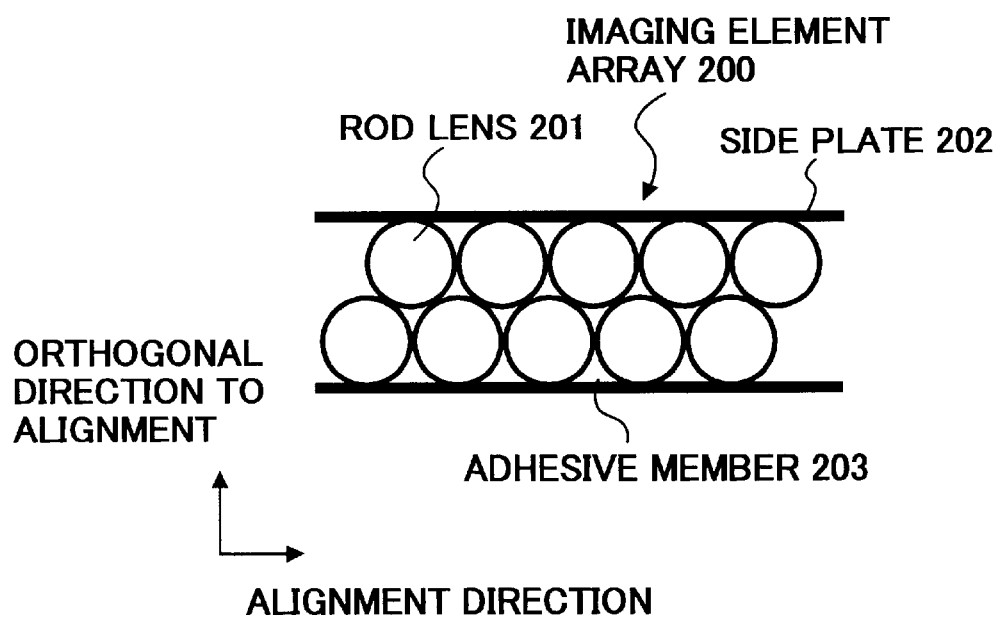
FIG. 2 is an explanatory chart for illustrating a configuration of one embodiment of an imaging element array according to the present invention.
Figure 3:
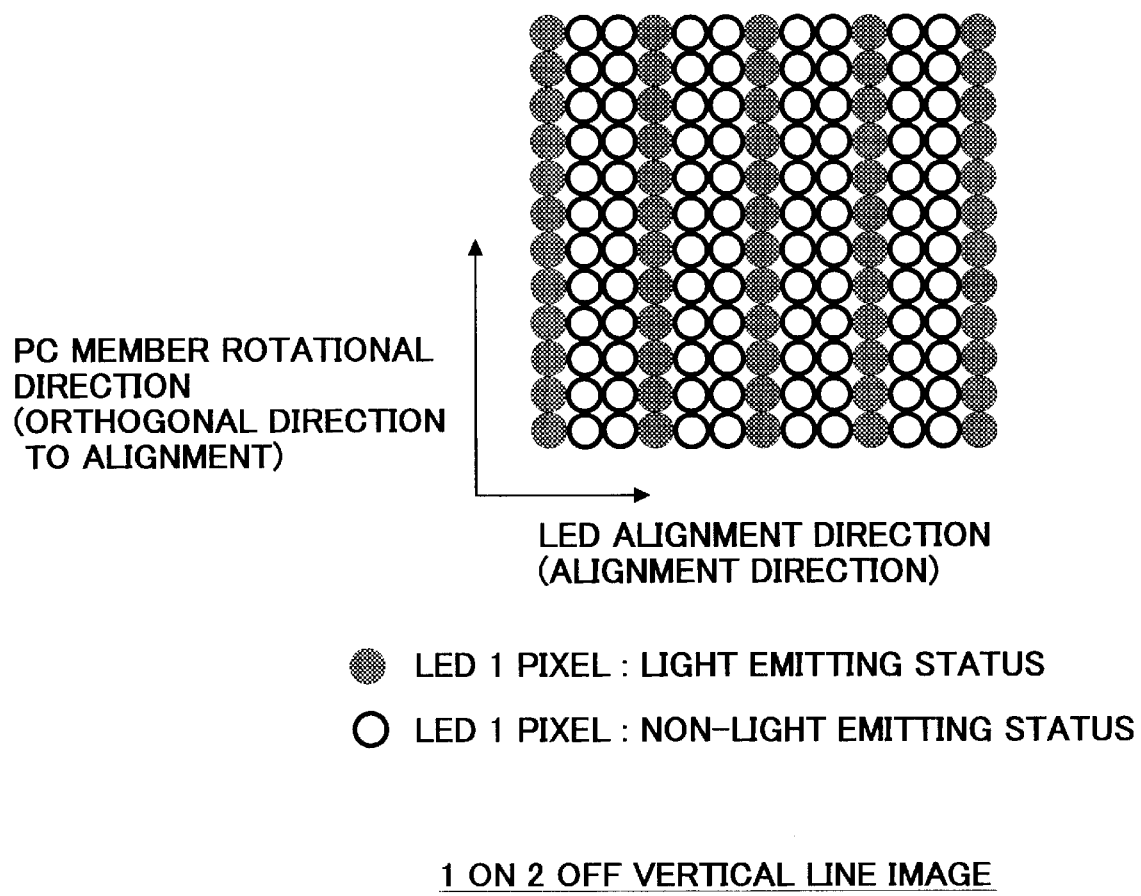
FIG. 3 is a chart for illustrating one example of an image pattern having a longitudinal line image in parallel with a PC member rotating direction when 1 dot light emission and 2 dots non-light emission (i.e., 1 on-2 off) are repeated.

FIG. 2 is a diagram for illustrating a construction of an imaging element array. The imaging element array 200 may be a rod lens array of a refraction index distribution type conventionally utilized. The rod lens array may be formed by stacking rod lenses 201 of a cylindrical refraction index distribution type in two lines such as a straw bag stack, and provides the erecting system both in an aligning and its orthogonal directions. The surrounding area of the rod lens 201 may be pinched by a side plate to hold the lens and gain strength. In addition, in the gap between neighboring rod lens 201, to make it into a solid state, an adhesive member 203 may be filled in. The adhesive member 203 may be opaque and exert a function of suppressing a flare light.

The optical writing unit employing the above stated light emitting element array 100 and imaging element array 200 may be mounted on an image forming apparatus, and output an image as an exposure unit. An image pattern may be a pattern formed by repeating 1 on and 2 off (i.e., 1 dot light emission, 2 dot non-light emission), and include an image of longitudinal lines (herein after referred to as a 1on-2off longitudinal image) in parallel with a rotational direction of the PC member (i.e., an orthogonal direction to an LED aligning direction (hereinafter referred to as an aligning orthogonal direction)).

Figure 4:
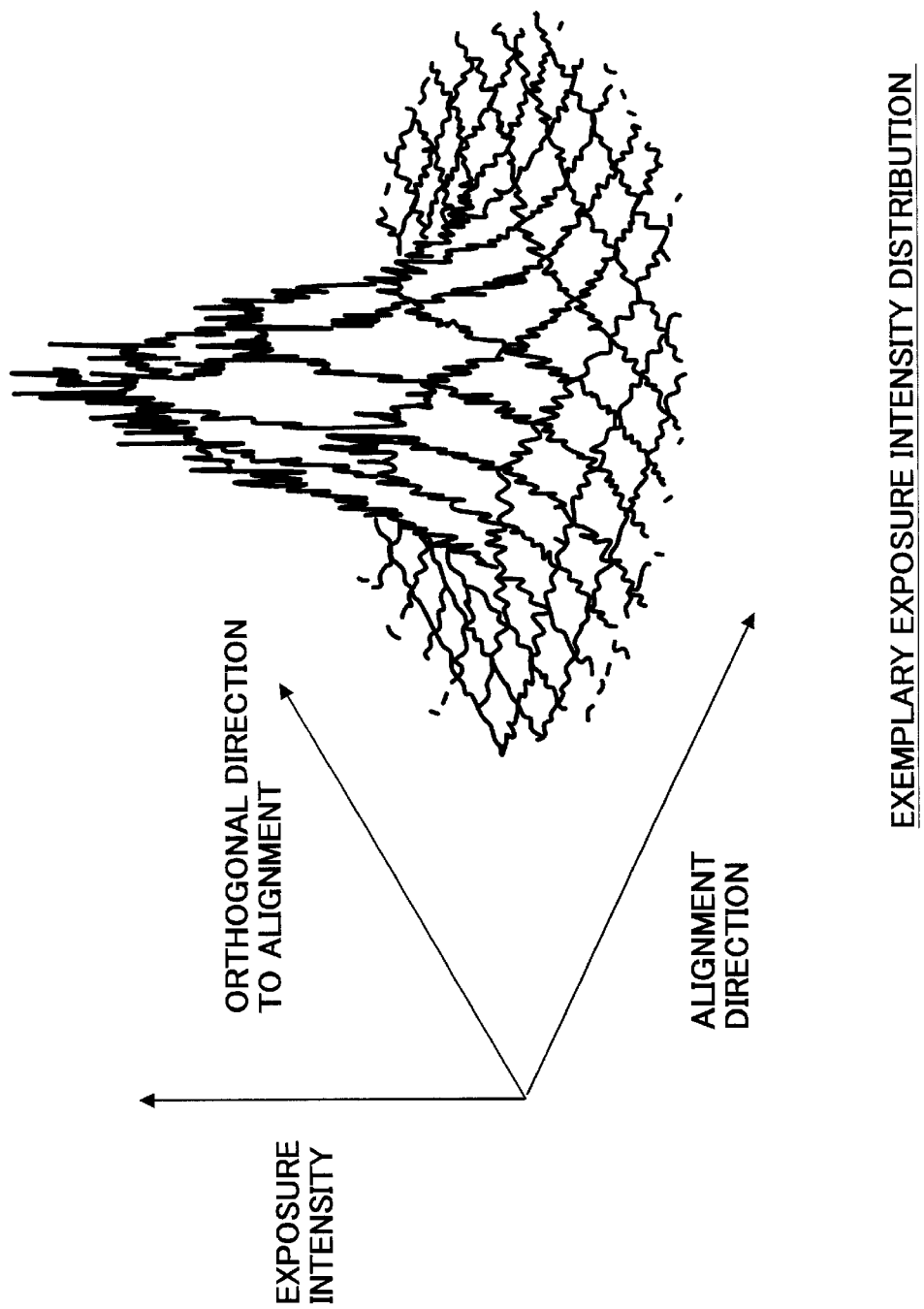
FIG. 4 is a chart for illustrating one example of an exposure intensity distribution of each light emitting element, which is measured by a two dimensional CCD when the 1 on-2 off operation is performed.
Figure 5:
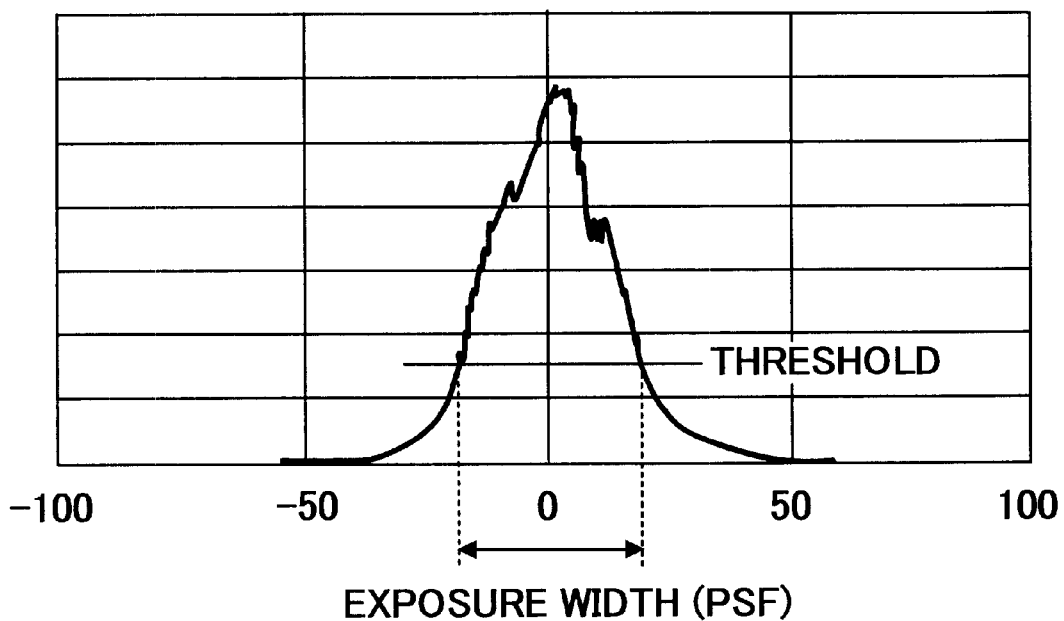
FIG. 5 is a chart for illustrating an exposure intensity distribution obtained from a cross section of the exposure intensity distribution of FIG. 4.
Figure 6:
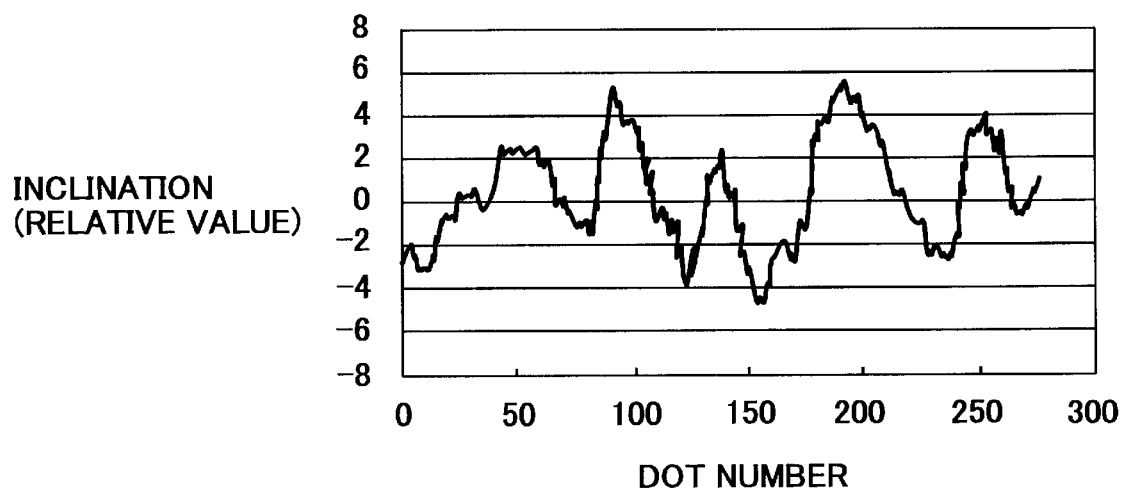
FIG. 6 is a chart drawn by first finding regression linear lines per a unit of nine successive measurement points each indicating an exposure width at a given threshold in a cross section of an exposure intensity distribution in an aligning direction as illustrated in FIG. 5 using a least squares approximation principle, and then plotting inclinations of these regression linear lines.

In this image, density unevenness (herein after referred to as a longitudinal line) is sometimes found in parallel with the aligning orthogonal direction. This may be the density unevenness (longitudinal line) attribute to both of the light emitting element and imaging element arrays 100 and 200, and a subject to be resolved. Then, an exposure light intensity distribution is measured per a light emitting element having emitted a light in the 1on-2off manner using a two dimensional CCD in this optical writing unit. An exemplary exposure light intensity distribution may be illustrated in FIG. 4 which has a three-dimensional perspective view. From this three-dimensional exposure light intensity distribution, a two-dimensional exposure light intensity distribution may be obtained from the cross section in the aligning direction thereof as illustrated in FIG. 5. Then, each of exposure widths (PSF) at a given threshold may be calculated for respective measurement points. As a result of the calculation, the regression linear lines (herein after referred to as approximation linear lines) may be obtained per a unit of successive nine measurement points by applying least squares approximation while shifting the unit by one measurement point. Then, inclinations of such approximation linear lines may be plotted for respective measurement points (i.e., LEDs) on a graph illustrated in FIG. 6. When comparing such a graph with the 1on-2off longitudinal line image, it can be found that the graph corresponds to a density change in the image.

Namely, density in the image may change from low (i.e., thin recognition) to high (dark recognition) in the vicinity of the section where an inclination of the approximation linear line is positive and an absolute value of the inclination is large. In contrast, density may change from high (dark recognition) to low (i.e., thin recognition) in the vicinity of the section where an inclination of the approximation linear line is negative and an absolute value of the inclination is large. In addition, density change in the image can be very small or zero when there is a small absolute inclination value. The above-described technology is now described more in detail using a model chart for demonstrating a correspondence between an inclination of an approximation linear line and a longitudinal line.

Figure 7:
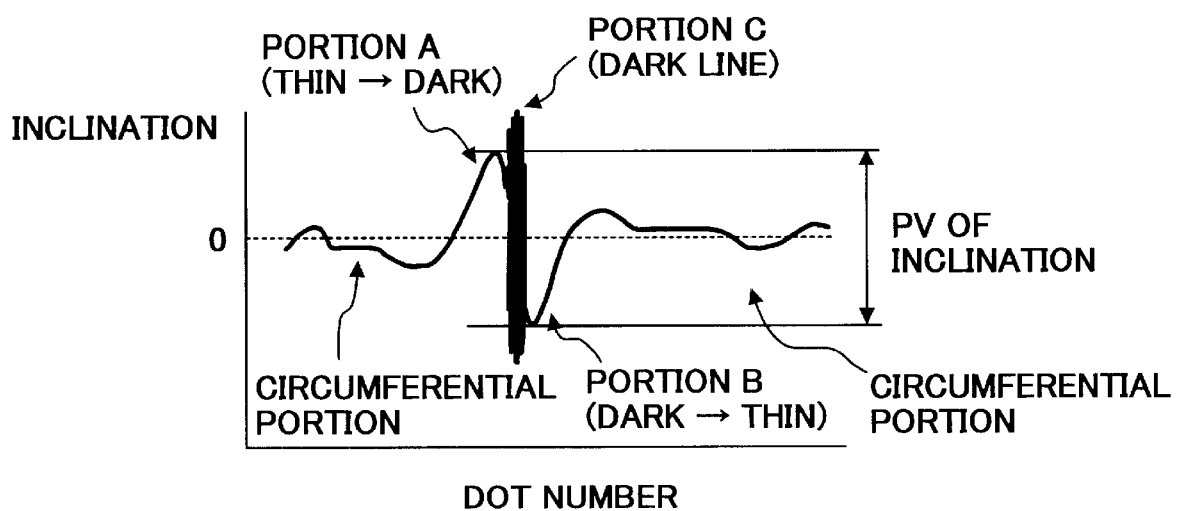
FIG. 7 is a diagram for illustrating a model showing a correspondence between an inclination of an approximation linear line and a dark longitudinal line.

FIG. 7 is a model chart for demonstrating a correspondence between an inclination of an approximation linear line and a dark longitudinal line. This drawing may relate to longitudinal lines recognizable as high density in relation to the circumjacent section. In the drawing, human eyes can recognize that density changes from thin to dark in the vicinity (i.e., section A) of the portion where the inclination of the approximation linear line is positive and the absolute inclination value is large (premising that density is dark in the circumjacent section). In contrast, human eyes can recognize that density changes from dark to thin in the vicinity (i.e., section B) of the portion where the inclination of the approximation linear line is negative and the absolute inclination value is large. Specifically, the section between the sections A and B (i.e., section C in the drawing) is dark, and is recognized as the longitudinal line (i.e., dark line) in the image. In addition, since larger density change is recognized in relation to the circumjacent section as the inclination absolute value is larger, a stronger (i.e., more distinct) line is recognized as the difference (i.e., an inclination of PV (Peak to Valley)) in inclination between sections A and B is larger.

Figure 8:
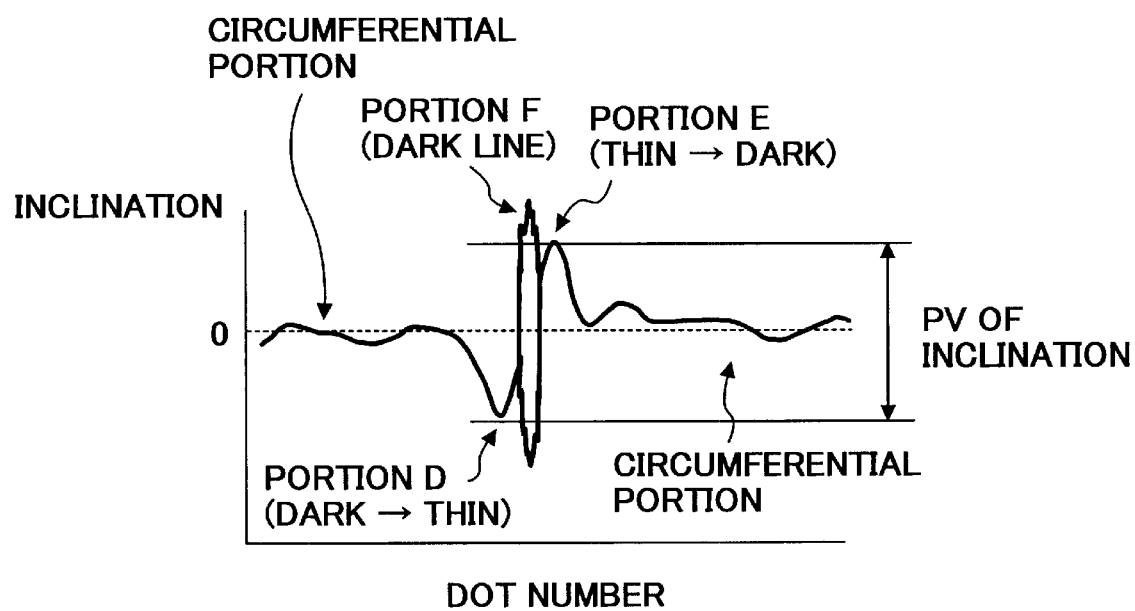
FIG. 8 is a diagram for illustrating a model showing a correspondence between an inclination of an approximation linear line and a thin longitudinal line.

FIG. 8 is a model chart for illustrating a correspondence between an inclination of an approximation linear line and a thin longitudinal line. Such a drawing may be related to longitudinal lines recognizable as being low density. In the drawing, human eyes can recognize that density changes from dark to thin in the vicinity (i.e., section D) of the section where an inclination of the approximation linear line is negative and an absolute inclination value is large (premising that density of the circumjacent section is dark). In contrast, human eyes can recognize that density changes from thin to dark in the vicinity (i.e., section E) of the section where an inclination of the approximation linear line is positive and an absolute inclination value is large. Specifically, the section (i.e., section F) between the sections D and E may be thin, and recognized as a longitudinal line (i.e., thin line).

In addition, since density change in relation to the circumjacent section is recognized lager as the inclination absolute value is larger, a stronger (more conspicuous) line is recognized as the inclination difference (i.e., an inclination of the PV) between sections A and B is larger.

Figure 9:
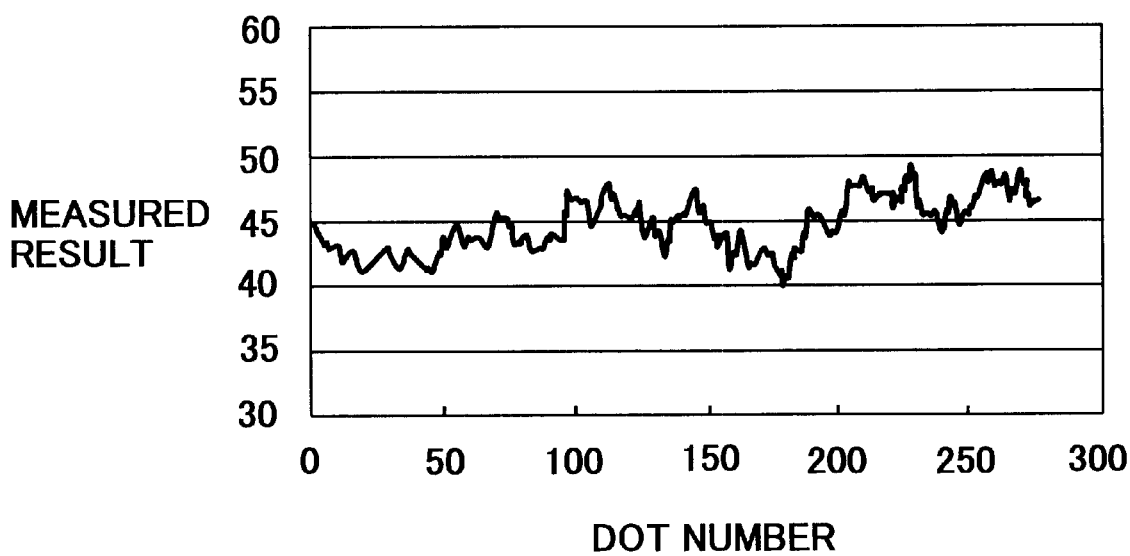
FIG. 9 is a chart for illustrating a measured value of an exposure width (Point Spread Function: PSF) of the exposure intensity distribution in the cross section of the aligning direction before an inclination of an approximation linear line is calculated.

A plurality of values measured from a plurality of exposure widths (PSF) of cross sections in the aligning direction before performing calculation of an inclination of the above-described approximation linear line may be illustrated in FIG. 9. In the graph, a change (i.e., difference) between neighboring measured values is conspicuous, and the longitudinal lines in the image are difficult to be recognized. In addition, concretization like the above-stated method is also difficult. Accordingly, a comparison value obtained from attributes of the plurality of light emitting elements (e.g. an inclination of the approximation linear line obtained from every unit of nine measurement points) closely represents the density change.

Figure 10:
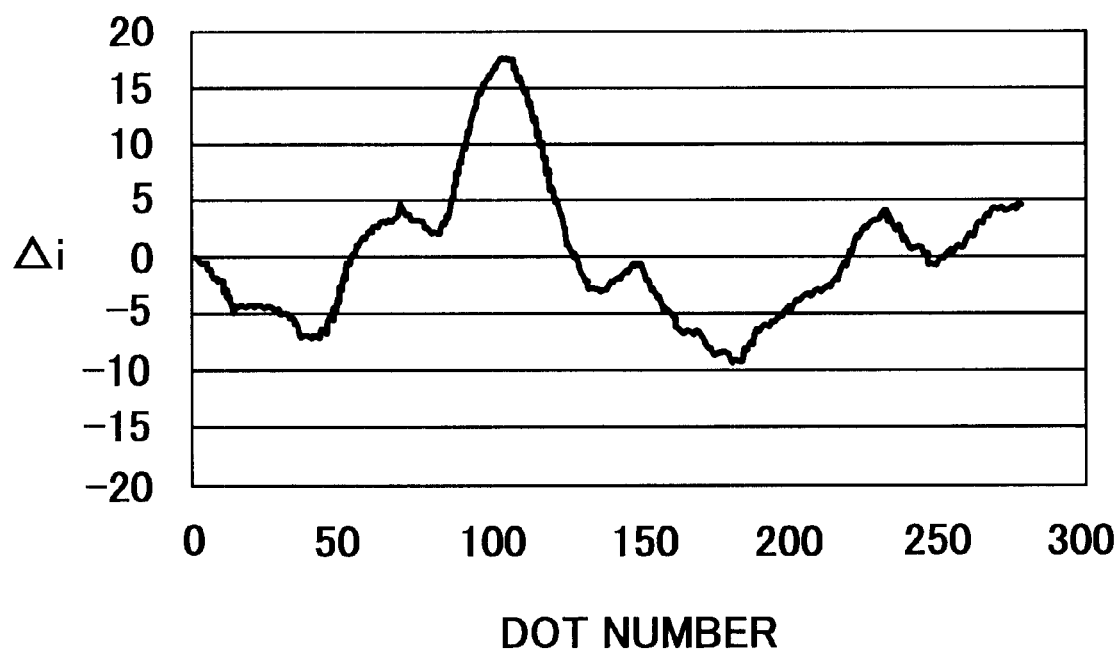
FIG. 10 is a chart drawn by plotting •i of the exposure area along with a dot number.

Another method for obtaining a comparison value is now described. Using another method, a graph is drawn as illustrated in FIG. 10. The graph may be formed in such a manner that a plurality of unit averages (Si• ave) is sought per a unit of five measurement points with regard to an exposure area (Si) of a target measurement point (i) by displacing the unit by one measurement point over the entire valid image region. Then, a plurality of differences •i between the below described total unit average (Save) and the unit average (Si• ave) may be plotted, wherein these reference numerals are defined as follows, wherein i=Entire valid image region, and N=A number of the entire measurement points:

•i=(Si•ave−Save)/Save×100: Si•ave=Si/5,(i=i−2,i−1, i, i+1,i+2)Save=(Si•ave)/N,

When comparing such a plotting result with the 1on-2off longitudinal image, it is noted therefrom that the difference •i of the unit average corresponds to the density change in the image. Specifically, such a comparison value (e.g. a difference in a unit average between each unit of five measurement points) obtained from the plurality of light emitting elements closely represents the density change. In other words, since the attribute Xi does not represent the density change in the image, and the comparison data made by a plurality of attributes including Xi corresponds to the density change, a fine image without practical use problems can be acquired if the comparison values can be suppressed within a range in which the longitudinal line is not noticeable. In addition, as mentioned with reference to the above-described example of FIG. 9, the attribute of each light emitting element does not closely correspond to whether the longitudinal line can be recognized or not. This is because high frequency-like behavior of individual attributes, such as variation of attribute between the neighboring light emitting elements, is difficult for human eyes to recognize. Low frequency-like behavior created by attributes of a plurality of light emitting elements would be rather easily recognized by human eyes. This may also be related to sensibility characteristic of the human eyes against the frequency. Accordingly, a fine image can be acquired if comparison values obtained from attributes of a plurality of light emitting elements are suppressed within the prescribed range.

Figure 11:
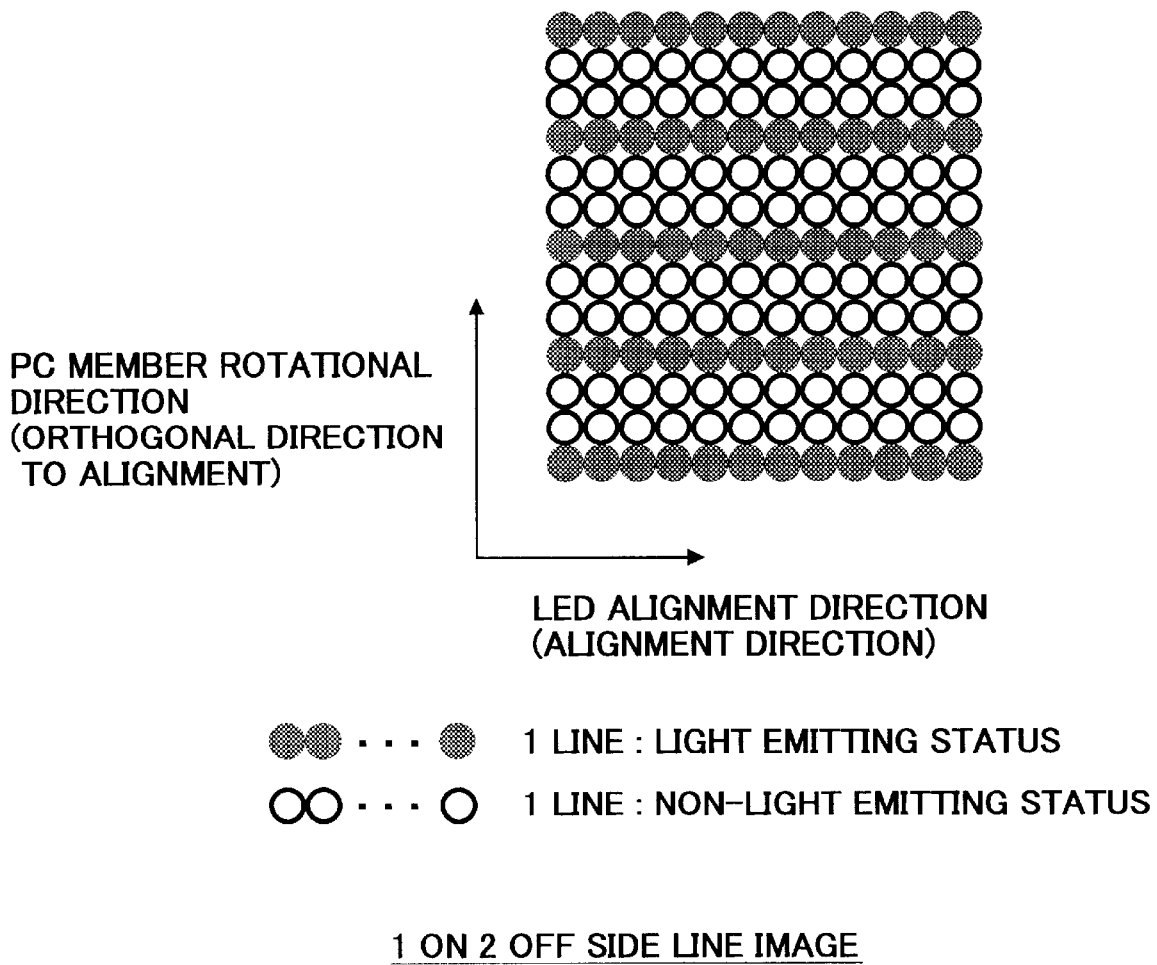
FIG. 11 is a chart for illustrating one example of an image pattern made by repeating 1 dot light emission and 2 dots non-light emission and having a longitudinal image perpendicular to a rotational direction of a PC member.
Figure 12:
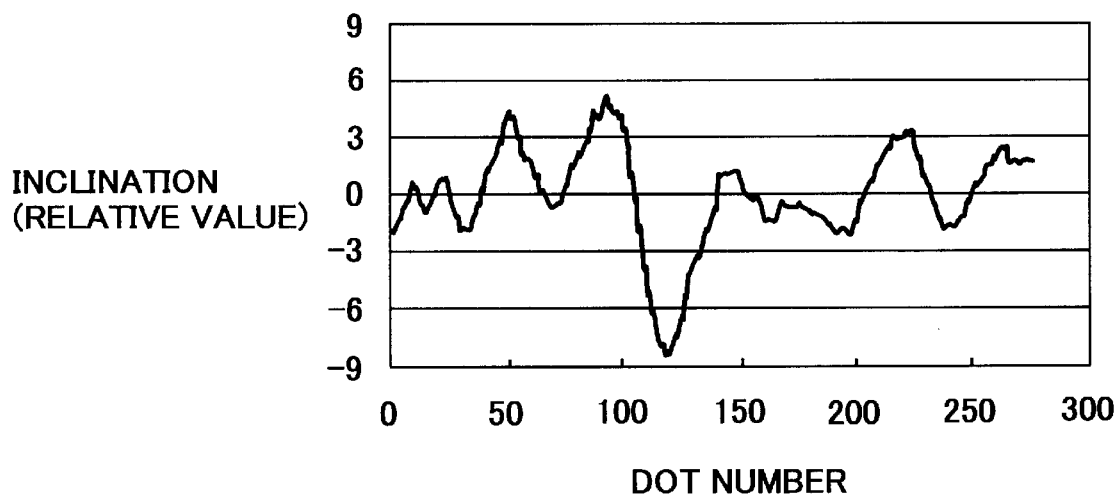
FIG. 12 is a chart drawn by first finding the regression linear line (approximation linear line) per a unit of nine successive measurement points indicating exposure widths (PSF) calculated from the exposure intensity distributions at a prescribed threshold in its cross section in the aligning orthogonal direction by using the least squares approximation principle, and then plotting the inclination of the approximation linear lines.

FIG. 11 is a diagram for illustrating a 1 on-2 -off-sideline image. Specifically, even when the image of the 1 on-2 off side line that is parallel with the LED aligning direction and perpendicular to the rotational direction of the PC member illustrated in FIG. 11 (i.e., a pattern repeating 1 line light emission and 2 line light non emission) is output as another image pattern, density unevenness (longitudinal line) sometimes appears in the longitudinal direction perpendicular to the side line in the image.

Then, the exposure width (PSF) of a cross section in the aligning orthogonal direction at a given threshold on the exposure intensity distribution is calculated with regard to the above-described measurement point, and the first regression line (the same to the approximation linear line) is found by a least squares approximation principle per a unit of successive nine measurement points based upon the calculation result. Then, a result of plotting of the inclination of the approximation linear line is illustrated in FIG. 2. When comparing with the 1on-2off sideline image, it can be noted therefrom that there exists a close correspondence to the density change in the image. In addition, it can also be noted that there exists a close correspondence to the density change in the image when the exposure area of a given threshold in the exposure intensity distribution is calculated and used.

From such facts, it is derived that even if an image pattern is different, the correspondence of a comparison value to a longitudinal line can be acquired. Specifically, by suppressing comparison values obtained from attributes of the exposure intensity distribution to less than a prescribed value, in other words, controlling the same within a preset range, with regard to all of the light emitting elements, a fine image without practical use problems may be acquired.

In addition, exposure widths (PSF) of both aligning and its orthogonal directions and an exposure area in an exposure intensity distribution as well as exposure widths (Line Spread Function: LSF) in both aligning and its orthogonal directions of an exposure intensity distribution integrated both in aligning and its orthogonal directions, respectively, can be utilized as attributes.

Figure 13:
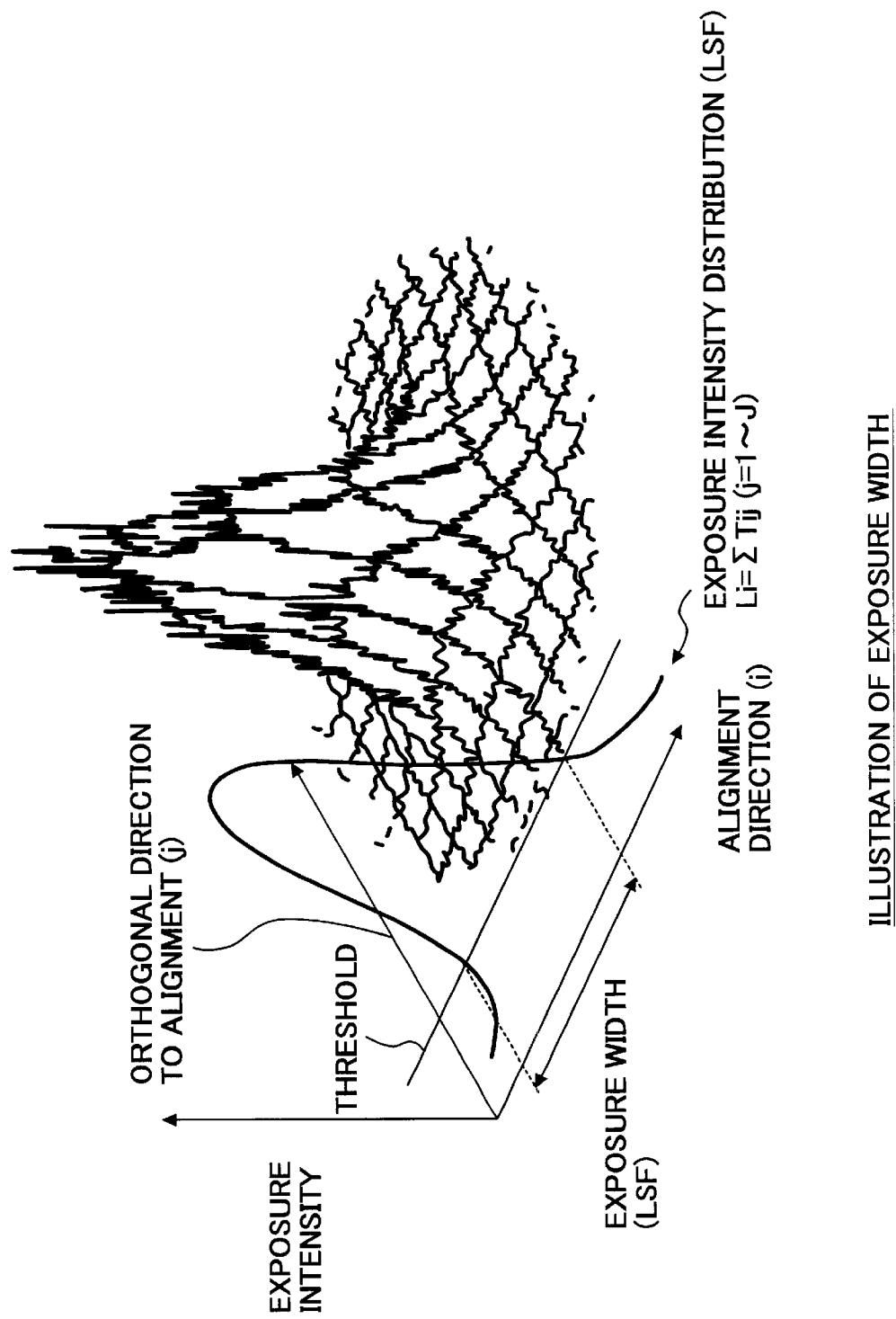
FIG. 13 is a chart for illustrating an exposure width (LSF)

The exposure width is described in more detail with reference to FIG. 13. When premising intensity of each pixel of a two dimensional CCD having (I×J) pixels as Tij (wherein (i) represents a pixel number in the aligning direction, and (j) represents that in the aligning orthogonal direction), and exposure intensity in the aligning orthogonal direction is integrated for an exposure intensity distribution (LSF; Li) in the aligning direction, the following formula is established:

$$Li = \cdot tij(j=1 \cdot J)$$

In contrast, when exposure intensity in the aligning direction is integrated for an exposure intensity distribution (LSF; Lj) in the aligning orthogonal direction, the following formula is established:

$$Lj = \cdot tij(i=1 \cdot I)$$

The exposure width (LSF) may be the one defined at a given threshold in the above-described exposure intensity distribution. Thus, the exposure width (LSF) may be an attribute including much more information related to intensity of the entire distribution than the exposure width (PSF) at cross sections of either an aligning or its orthogonal direction.

In the present invention, both of the exposure width (PSF and LSF) and exposure area at a given threshold are exemplified as attributes of the exposure intensity distribution. However, a beam width and/or a beam area that are $(1/\cdot)^2$ and/or ½ of a peak intensity according to a beam profile assessment with regard to an ordinal optical unit can be utilized.

When viewing from a light spot irradiated side such as a PC member, since a latent image is formed in a accordance with an exposure intensity distribution of an irradiated light spot, the exposure intensity value is important. In addition, a relative attribute such as one of beam width and a beam area with regard to the peak intensity is difficult to correspond to the latent image.

This results in a problem due to unevenness of the light emitting quantity existing among light emitting elements if an optical unit includes a plurality of light emitting elements.

In addition, this goes for not only the solid writing system employing a light emitting element array having a plurality of light emitting elements, but also an optical scanning system employing either a plurality of semiconductor lasers (multi LD light source) or a semiconductor laser array (LD array light source).

Figure 14:
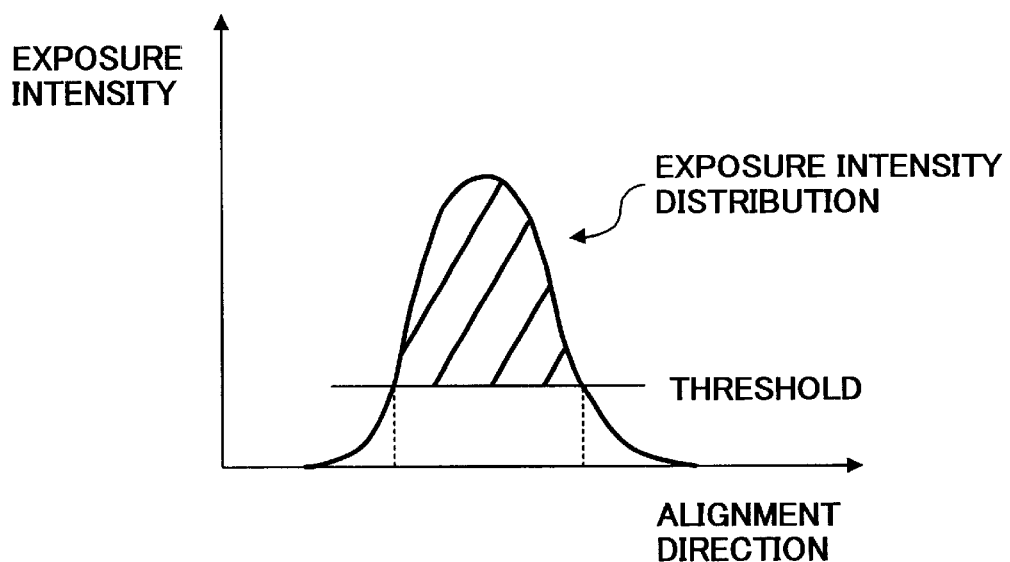
FIG. 14 is a chart for illustrating an integral of exposure values higher than a threshold.
Figure 15:
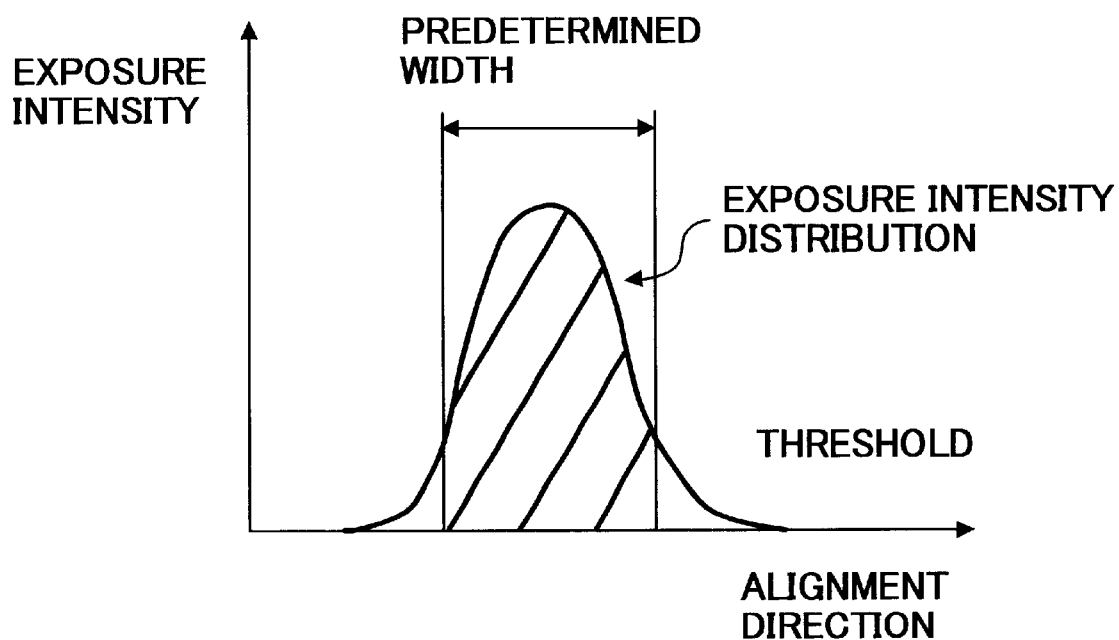
FIG. 15 is a chart for illustrating an integral of exposure values residing within a prescribed range.

As described above, an attribute may be a value that represents an exposure intensity distribution by a geometrical form of a width and area such as an exposure width (PSF and LSF) and an exposure area. In contrast, an attribute of the exposure intensity distribution can be a value that represents an exposure intensity distribution as a quantity such as an integral exposure quantity and a peak exposure quantity. In addition, the integral exposure quantity can be an integral of the exposure quantity more than a given threshold as illustrated in FIG. 14, or that of the exposure quantity falling with in a given width as illustrated in FIG. 15. Of course, a plurality of the above-described attributes can be utilized together, and combinations thereof are also possible. For example, it can be possible that two attributes of the exposure widths (PSF) in cross sections of both aligning and its orthogonal directions can be used and suppressed within given values, respectively. In addition, a prescribed attribute obtained from a relational expression that is led from an exposure area and an integrated exposure quantity can be used and suppressed within a given quantity.

In addition, in the above-described embodiment, the plurality of light emitting elements is premised to have five and nine measurement points when the 1 on-2 off light emission is performed. However, the present invention is not limited to such values. Specifically, a prescribed number of comparison points capable of corresponding to a density change in an image, and a plurality of successive light emitting elements (i.e., measurement points) can be selected. The number may depend upon a pitch of the light element array.

In addition, as an optical writing unit composing device, the LED array is utilized as a light element array 100, and the rod lens array of the refraction index distribution lens type is employed as an imaging element array 200 in this embodiment. However, the present invention is not limited to those.

As a light emitting element array 100, there exists an EL array utilizing organic EL elements etc., beside the LED array, and can be arranged not only in a line but also in plural lines. In addition, a halogen light source and an optical shutter array having an opening/closing controllable shutter array arranged in front of each pixel can be utilized as a light emitting element array of a different type.

In addition, the imaging element array 200 can be a micro-lens array arranged corresponding to a light emitting element one to one, a known roof mirror lens array, and a roof prism lens array.

Figure 16:
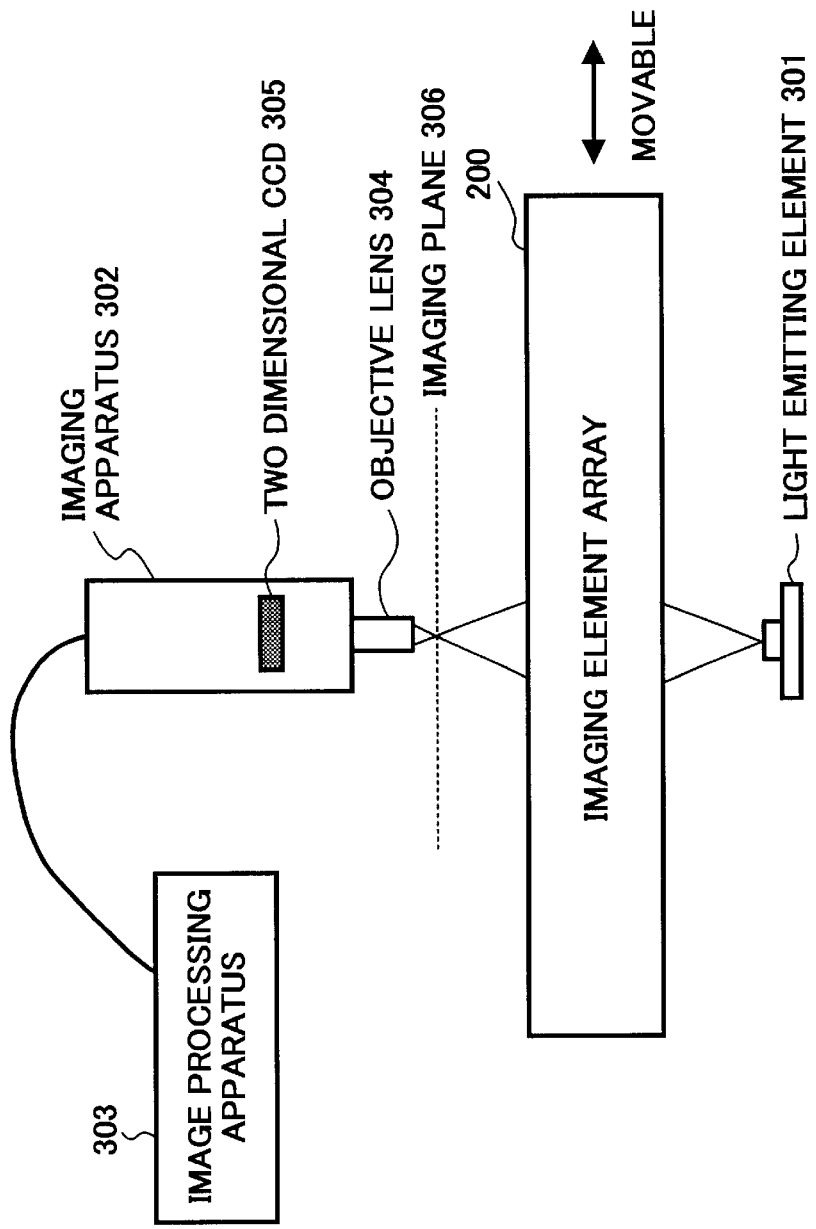
FIG. 16 is a schematic chart for illustrating an inspecting apparatus for inspecting an imaging element array according to one embodiment of the present invention.

One example of an inspecting apparatus and a method for inspecting an imaging element array are now described with reference to FIG. 16.

The inspection apparatus 300 may mainly include a light emitting element 301, an imaging apparatus 302, and an image processing apparatus 303 that executes prescribed image processing in response to image data from the imaging apparatus 302. In the imaging apparatus 302, a two dimensional CCD 305 that reads an image after imaging is performed by an objective lens 304. Image data read by the two-dimensional CCD 305 and converted into an electric signal may be output to the image processing apparatus 303.

When inspecting with the inspection apparatus 300, a given light emitting element 301 is fixed and an imaging array 200 may be arranged in a desired position with regard to the light-emitting element 301. Then, the light emitting element 301 may be activated. A light reflux ejected from the light emitting element 100 may form a light spot on the imaging surface 306 via the imaging element array 200. As a typical method for measuring an exposure intensity distribution on the imaging surface 306, there exists a method for enlarging a light spot image using the objective lens 304 and taking in the two dimensional CCD 305. The detected intensity distribution data as illustrated in FIG. 4 may receive data processing from the image processing apparatus 303, thereby a desired attribute may be found.

In addition, the imaging element array 200 may be supported by a movable stage (not shown), and is movable in a longitudinal direction thereof (i.e., aligning direction). Specifically, while conveying the imaging element array 100 by a given pitch, the exposure intensity distribution can be measured. By measuring in such a manner, because the light emitting element 301 is fixed, the exposure intensity distribution not depending upon unevenness of the light emitting element but based upon only that of the imaging element array 200 can be measured. However, the present invention is not limited to the above-described method for measuring an optical spot and a known method can be applied.

In such a manner, the exposure intensity distribution is measured with regard to the entire valid image region. From the measurement result, the above-stated attributes are found at a plurality of measurement points. It is then inspected if all of the comparison values are less than a prescribed level capable of suppressing a density change, for example.

When unevenness of the light emitting characteristic (such as a light emitting size and a light ejection profile or the like) of the light emitting element array 100 is small, the main cause of the unevenness of the optical writing unit may rest with the imaging element array 200. In particular, the refraction index distribution type rod lens array of FIG. 33 of conventional use produces large unevenness due to rod tilting or unevenness of the refraction index distribution. Specifically, if the comparison value of the attributes is previously suppressed within a prescribed range in the imaging element array 200, an optical writing unit capable of suppressing unevenness may be acquired. Accordingly, the optical writing unit may be set so as to enable comparison values obtained from applicable attributes of a plurality of light emitting elements to be suppressed within a prescribed range over the entire valid image region. In addition, only the imaging element array is inspected and it is possible to omit the inspection of the optical writing unit.

In addition, in some instances an attribute in the exposure intensity distribution of the imaging element array 200 can be different from that of the exposure intensity distribution of the optical writing unit.

An example in which an optical writing unit constituted by a light emitting element array 100 and an imaging element array 200 determined as a fair quality through inspection is now described.

The inspection of the imaging element array 200 has an object to estimate unevenness of the imaging element array 200. To achieve the object, an exposure width (PSF), for example, of the cross section in the aligning direction may be premised as an attribute. In addition, since it is an object of an optical writing unit, which utilizes the imaging element array 200 estimated to be of fair quality through the inspection, to acquire a superior image, an exposure area may preferably be premised as an attribute. Also, a comparison value obtained from attributes may be suppressed within a prescribed range.

Specifically, to suppress all of comparison values of a writing unit within a prescribed range, it is desirable to grasp beforehand how to select attributes of the light emitting element array 100 and imaging element array 200 from a relation between a light emitting characteristic of the light emitting element array 100 and an imaging characteristic of the imaging element array 200, which are combined with each other. By thus devising, an optical writing unit having a prescribed attribute may be obtained through the inspection of the imaging element array 200. Off course, it is allowable that both of the attributes of the imaging element array 200 and the optical writing unit are substantially the same.

In addition, when both of the attributes of the imaging element array 200 at the time of the inspection and optical writing unit are substantially the same, the prescribed ranges within which comparison values are to be suppressed can be different from each other and/or the same.

Another example in which an exposure width of a cross section in the aligning direction is premised as attribute is now described.

When unevenness of an exposure attribute (e.g. a light emitting size) of the light emitting element array 100 is larger, it is desirable to previously consider unevenness of the exposure width (PSF) of the cross section in the aligning direction which is caused by unevenness of the light emitting size. In addition, it is also desirable that a prescribed range that comparison values obtained from exposure widths (PSF) of imaging elements of the imaging element array 200 are to be suppressed within less than that the comparison values obtained from the optical writing unit is to be suppressed.

In contrast, when unevenness of the exposure characteristic of the light emitting element array 100 is small and the exposure width (PSF) of the cross section in the aligning direction is affected very little, it is possible to equalize the prescribed value for suppressing comparison values of the imaging element array 200 with those for suppressing comparison values of the optical writing unit. Inspection for the optical writing unit may exceptionally be negligible in that case.

As stated above, when using the rod lens array, unevenness of an imaging characteristic arises owing to a manufacturing error at the time of those alignment, because it is constructed by aligning and sandwiching a plurality of rod lenses using side plates. In addition, when using the refraction index distribution type rod lens, it is even difficult to manufacture substantially the same refraction index, because a chemical process or the like controls refraction index of the inside portion of the lens. Accordingly, it is preferable that the unevenness caused by the alignment is decreased by integrally forming each imaging element over the entire valid image region. In addition, an imaging element array is preferably the one made by a fabrication in which the plane shape of an imaging element is transferred from a mirror finished surface of a molding piece, and not preferably an imaging element of the refraction index distribution type.

Figure 17:
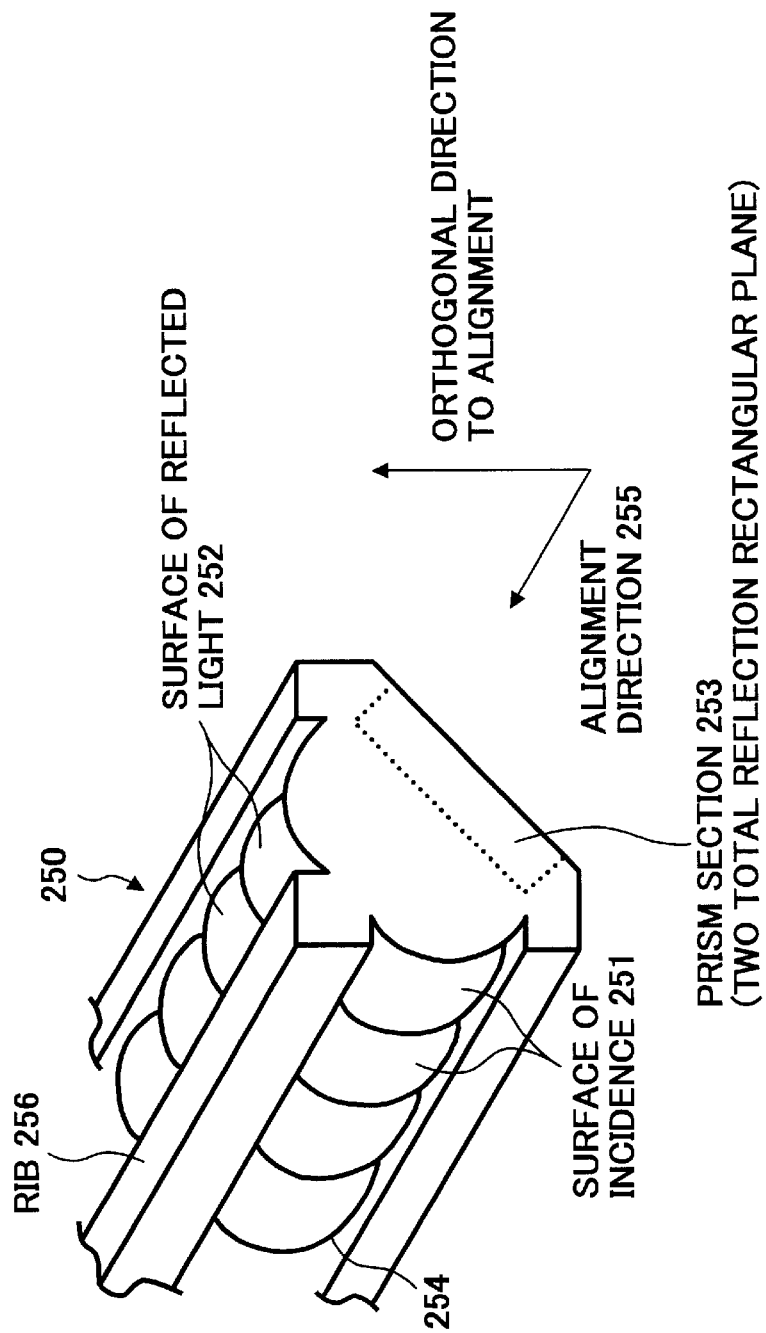
FIG. 17 is a perspective view for illustrating an imaging element array according to one embodiment of the present invention.

One example of the imaging element array fabricated in this manner may be illustrated in FIG. 17 illustrating one example of a roof prism lens array (RPLA) 250 that is integrally fabricated with plastic. The roof prism lens array 250 may include and arrange a roof prism lens 254. The roof prism lens 254 may be composed of an incident surface 251, a beam ejection surface 252, and a prism section 253 for leading a light flux from the incident surface 251 to the beam ejection surface 252 in the aligning direction 255 in a line, and form an array with it being secured by a rib 256.

Thus, by utilizing an optical writing unit determined to be of fair quality through the inspection of whether comparison values of attributes of the plurality of light emitting elements are suppressed within a prescribed range over the entire valid image region, an image forming apparatus characterized by a high quality image can be acquired. In addition, image output inspection or the like may be negligible in the image forming apparatus.

Figure 18:
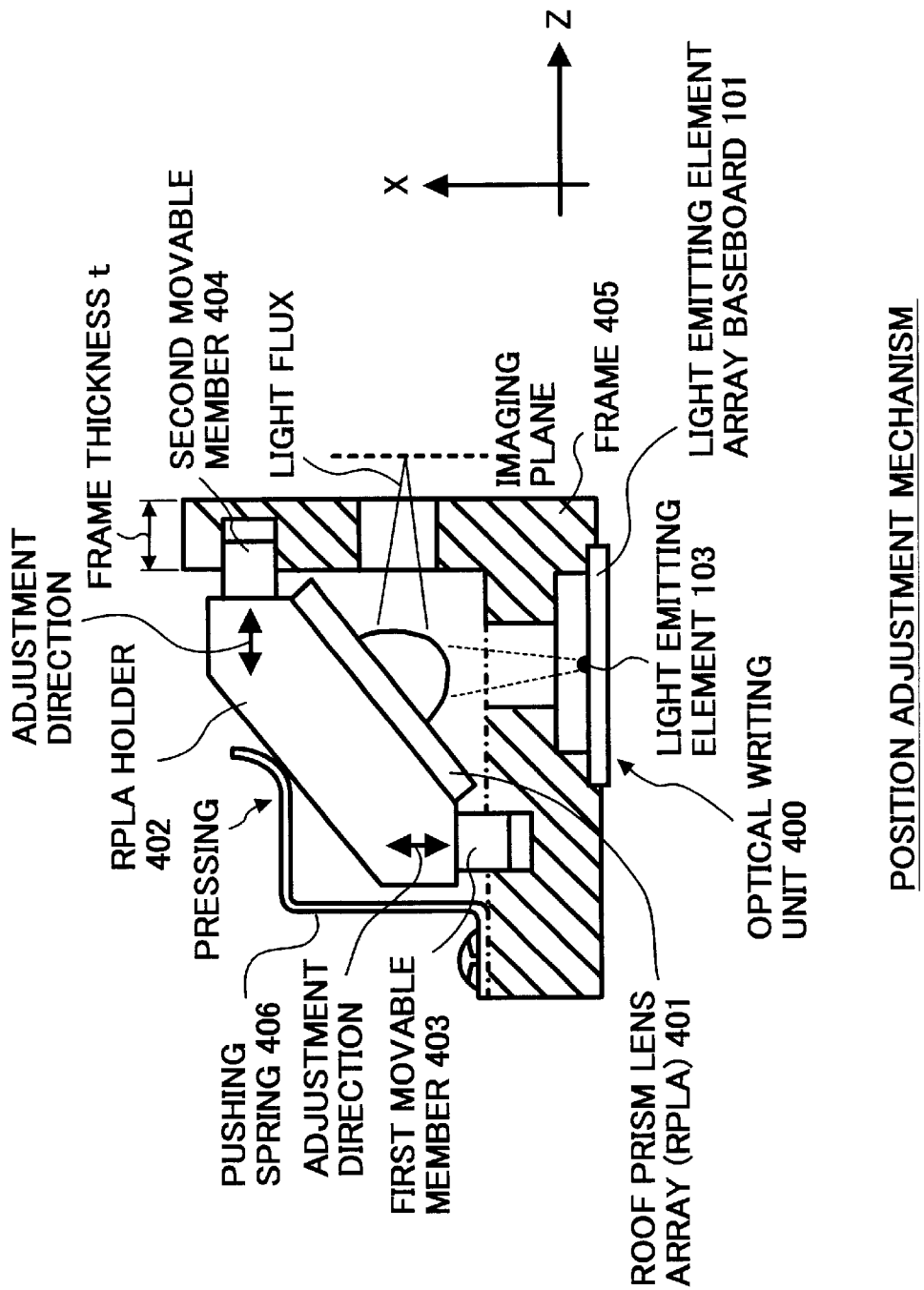
FIG. 18 is a chart for illustrating one example of a positional relation adjustment mechanism for adjusting a positional relation between the light emitting array and the imaging element array.

One example of a positional adjustment mechanism for adjusting a positional relation between a light emitting element array 100 and an imaging element array 200 is now described with reference to FIG. 18 illustrating a side view of an optical writing unit 400 employing a light emitting element array 100 and a roof prism lens array (RPLA) as an imaging element array 200.

The light emitting element may be arranged on a light emitting array baseboard 101 in a line in a direction perpendicular to a paper. A frame made of aluminum and plastic or the like may support the light emitting array baseboard 101. A RPLA holder 402 that is supported by a frame 405 via the first and second independently movable members 403 and 404 may support the RPLA 401. As noted from FIG. 18, the frame 405 may have a cross section in the shape of almost L. The first and second movable members 403 and 404 may be arranged at both ends in a longitudinal direction of the optical writing unit 400 (i.e., a direction perpendicular to a paper), respectively. In addition, the first and second movable members 403 and 404 may support the RPLA 401 in the X-axis and Z-axis directions, respectively, as illustrated in the drawing. In addition, the RPLA holder 402 may be pressed against the frame 405 by a pressing spring 406.

In a thus constructed optical writing unit 400, the first movable member 403 can move the RPLA in the X-axis direction. In addition, by differentiating a movable amount at respective ends in the longitudinal direction of the first movable member 403 positioning, it can be inclined around the Z-axis. On the other hand, by the second movable member 404, the RPLA 401 can move in the Z-axis direction as illustrated in the drawing. In addition, by differentiating a movable amount at respective front and rear side ends in the longitudinal direction of the movable member 404, it can be inclined around the X-axis. Accordingly, the RPLA 401 can be controlled by adjusting a movable amount of the first and second movable members 403 and 404 at respective both ends.

With such an adjustment mechanism, the position of the RPLA 401 can be adjusted with regard to the light emitting element array, so that comparison values obtained from attributes of the plurality of light emitting elements can be suppressed within a prescribed range over the entire image region.

Another example where a processing error arises in the frame 405 that supports the light emitting element array 100 and imaging element array 200 is described. In this case, a frame thickness (t) becomes large in a direction shown in the drawing and the RPLA 401 as result is deviated from an imaging plane (i.e., defocus condition), thereby the light spot becomes fuzzy. However, by controlling the movable amount of the second movable member 404 with the adjustment mechanism, the RPLA 401 can be controlled to locate at a prescribed position. In addition, it is possible to intentionally fade the light spot.

According to the present invention, a comparison value obtained from attributes of a plurality of light emitting elements can be set as being suppressed. Although fading the spot light results in inferior of MTF, unevenness of the exposure area or the like, in contrast, decreases.

Figure 19:
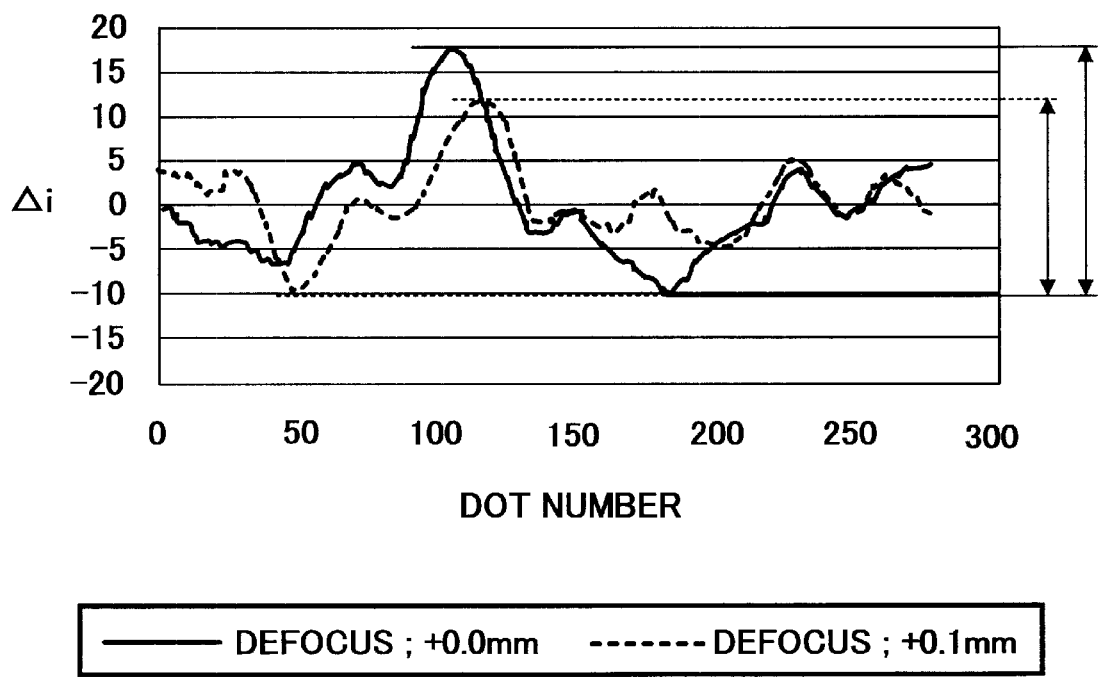
FIG. 19 is a chart for illustrating •i of the exposure area along with a dot number at a time of defocus.

A specific example is now described with reference to FIG. 10 illustrating a result on an imaging position where a defocus amount is 0.0 mm. However, an exposure area may be measured at a defocus position where a defocus amount is +0.1 mm under the same condition. From the measurement result, as shown in FIG. 10, a result of finding of a difference •i in a unit area average can be achieved, as illustrated in FIG. 19. From such a drawing, it is understood that a range that the difference •i can take is smaller at the defocus position. This may represent that the comparison values attributes of the plurality of light emitting elements can be suppressed by defocusing and fading the light spot. When practically observing an image output result at the defocus position, density unevenness is decreased when compared with that at the imaging position.

In the above-described embodiment, the light emitting element array 100 is fixed and the imaging element array 200 is movable. However, the imaging element array 200 can be fixed and the light emitting element array 100 can be movable, in contrast. In addition, both can be movable. Specifically, it is enough to design such that a relative positional relation between both can be changed. In addition, there exist many positional relation adjusting manners for fading the light spot. However, in order to fade only the light spot while not causing an image positional displacement or the like, it is desirable to adjust the imaging element array 200 to the defocus direction.

A driving control operation for the light emitting element is now described with reference to FIG. 20. A light emitting quantity of each light emitting element may be set by a computing and processing device. The computing and processing device may include a CPU as a central control apparatus (not shown), a ROM in which program for performing control is written, and a RAM to be used as a work area when the CPU performs an operation in accordance with the program. The CPU may determine a correction value given to each of light-emitting elements in accordance with the program. In addition, it is desirable that a measurement apparatus or the like for measuring an attribute of the exposure intensity distribution includes the computing and processing device.

Figure 20:
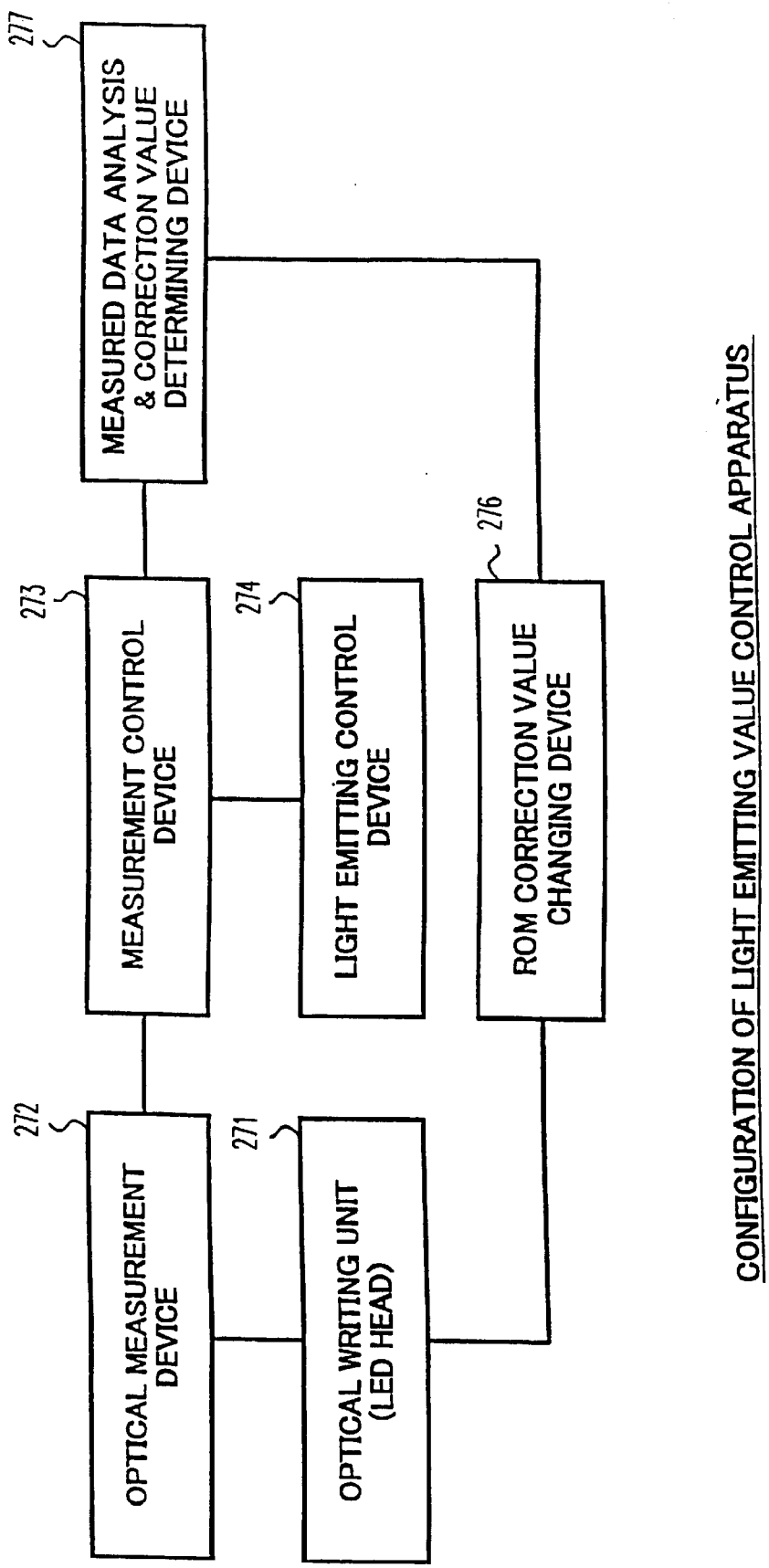
FIG. 20 is a block chart for illustrating a configuration of a light emitting quantity control apparatus.

FIG. 20 is a functional block chart for illustrating a configuration of a light emitting quantity control apparatus including a computing and processing device. The light emitting quantity control apparatus may include an optical writing head (LED head) 271, an optical measurement device 272, a measurement control device 273, a light emitting control device 274, a measured data analysis and correction value determining device 275, and a ROM correction value changing device 276. In a thus constructed light emitting quantity control apparatus, by having a plurality of light emitting elements constituting the optical writing unit 271 which generates a light beam under the control of the light emitting control device 274, an attribute in an exposure intensity distribution of each light emitting element may be measured by the optical measurement device 272 that is controlled by the measurement control device 273. The measurement resultant value obtained by the optical measurement device 272 may be computed and processed by the measured data analysis and correction value-determining device 275. In the correction value-determining device 275, a correction value for each light emitting element may be determined so as to prevent the density unevenness from being prominent. The correction value determined may then be stored in the ROM arranged either externally or in the optical writing unit 271. Simultaneously, the ROM correction value changing device 276 may rewrite the ROM based upon the correction value that has been determined, and the optical writing unit 271 may be driven with a light emitting quantity based upon the correction value stored in the ROM. In addition, the measurement control device 273, the light emitting control device 274, the measured data analysis and correction value determining device 275, and the ROM correction value changing device 276 illustrated in FIG. 20 may correspond to the computing and processing device.

Figure 21:
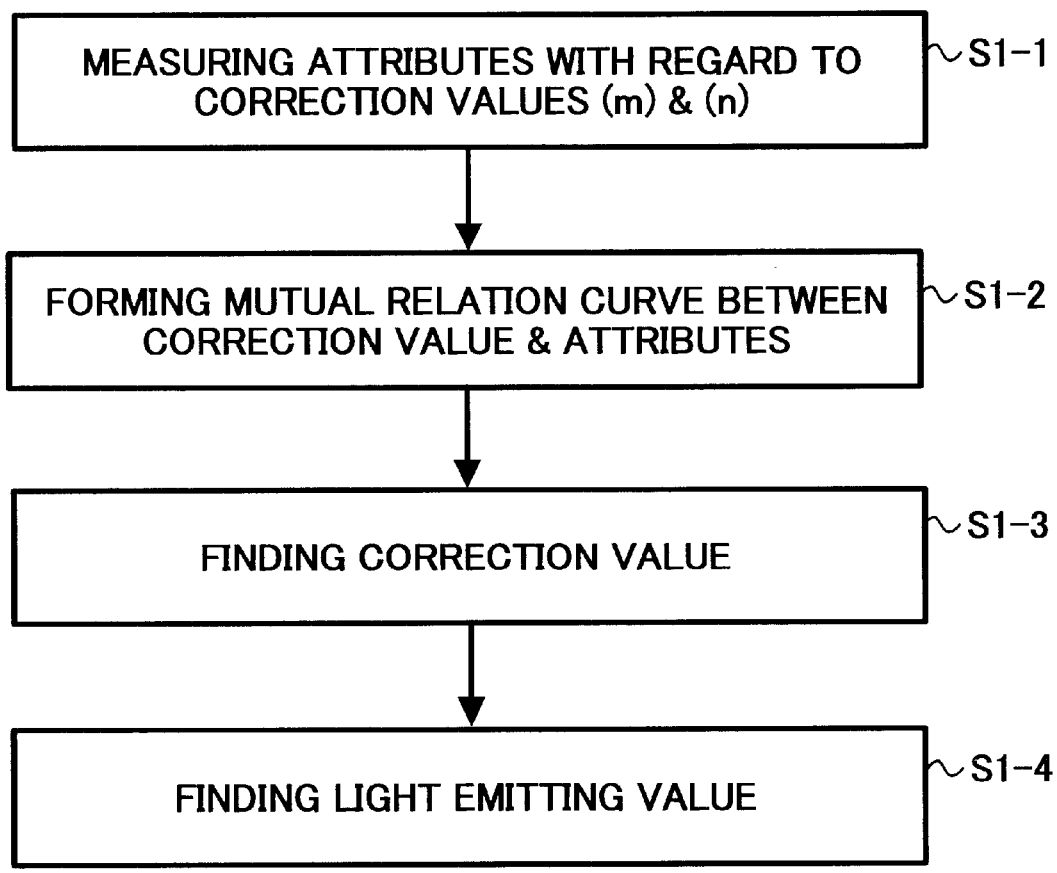
FIG. 21 is a flowchart for illustrating a control procedure of the first control example of a correcting process.

The first exemplary control is now described with reference to FIG. 21. Specifically, two correction values are initially given to each light emitting elements so as to generate lights. Prescribed attributes in exposure intensity distributions are measured corresponding to correction values in step S1-1. The correction value may include four bits and from 0 to 15 and control a driving current for driving an LED. As a measurement method, one or two-dimensional CCDs and a known method using a prescribed slit can be utilized. From the measurement, a correlation curvature indicating correlation of a correction value and an attribute of each light emitting element may be obtained in step S1-2. Based upon such a correlation curvature, a prescribed attribute may be obtained. Then, computing and processing may be performed so as to suppress a prescribed comparison value obtained from such attributes of the plurality of light emitting elements within a prescribed range over the entire valid image region. As a result, a desirable correction value for each light emitting element may finally be determined in step S1-3. In addition, a light emitting quantity corresponding to the correction value may be determined in step S1-4.

The above-described control is described below in more detail. In step S1-1, two-correction values (m) and (n) are given with regard to each light emitting elements within the valid image region, and prescribed attributes in the exposure intensity distributions may be measured. Specifically, the correction value (m) is initially given to the light emitting element (i) and make it generates a light beam. Then, a prescribed attribute in a corresponding exposure intensity distribution is measured as (Pim). Subsequently, the correction value is changed to (n) and a light beam is generated. Then, an attribute is measured as (Pin). Subsequently, the correction value (m) is given to the light emitting element (j) and a light beam is generated. Then, an attribute is measured as (Pjm). Subsequently, the correction value is changed to (n) and a light beam is generated. Then, an attribute is measured as (Pjn). Regarding the light emitting element k, measurement may be performed in substantially the same manner, and Pkm and Pkn may be found. After that, the measurement may similarly be performed with regard to the entire light emitting elements within the valid image region.

Beside the above-described procedure, the following may be employable. First, a correction value (m) is given to the light emitting element (i), and a light beam is generated. Then an attribute is measured as (Pim). Subsequently, the correction value (m) is given to the light emitting element (j), and a light beam is generated. Then an attribute is measured as (Pjm). In addition, the correction value (m) is given to the light emitting element (k), and a light beam is generated. Then an attribute is measured (Pkm). Subsequent to that, the measurement may be similarly performed with regard to entire light emitting elements. Next, a correction value (n) is given to the entire light emitting elements (i, j, k, •), and light beams are generated. Then attributes are measured as (Pin, Pjn, Pkn, •).

From such a measurement result for each of the entire light emitting elements, a correlation curvature of each of the correction value and the corresponding attribute may be obtained and formed in step S1-2. In addition, the correlation curvature may be supposed to be a linear line. Thus, when an inclination of the linear line for the light emitting element (i) is referred to as (ai) and an intercept is referred to as (bi), such (ai) and (bi) can be found by calculating the following simultaneous equation:

$$Pim = ai \times m + bi$$

$$Pin = ai \times n + bi$$

Figure 22:
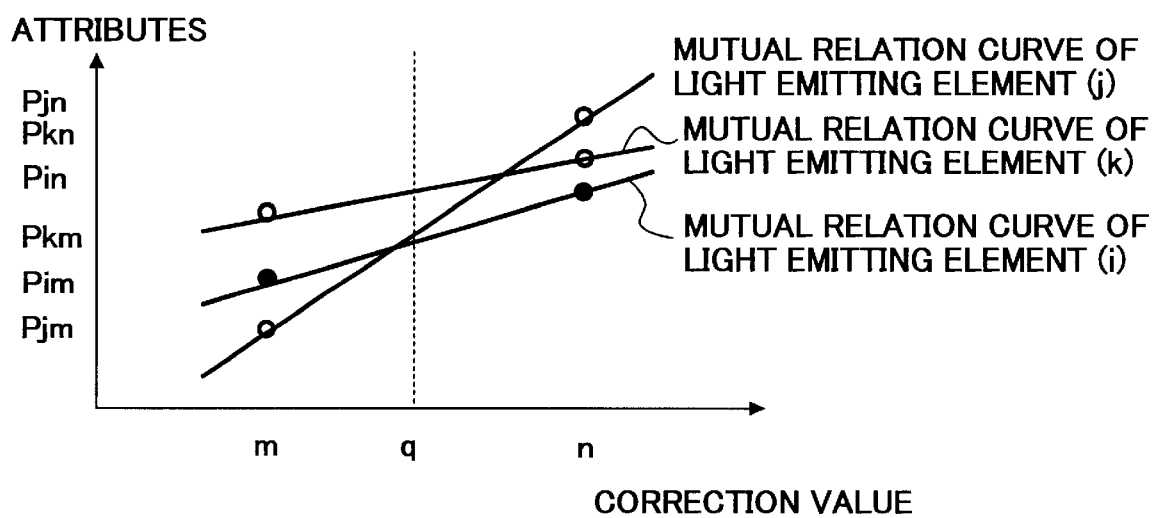
FIG. 22 is a chart for illustrating correlation curvatures formed by the process of FIG. 21.

Similarly, inclinations aj, ak, •, and intercepts bj, bk, • may be found for the light emitting elements j, k, •. Thus, a correlation curvature of the correction value and attribute can be obtained and formed as illustrated in FIG. 22.

Figure 23:
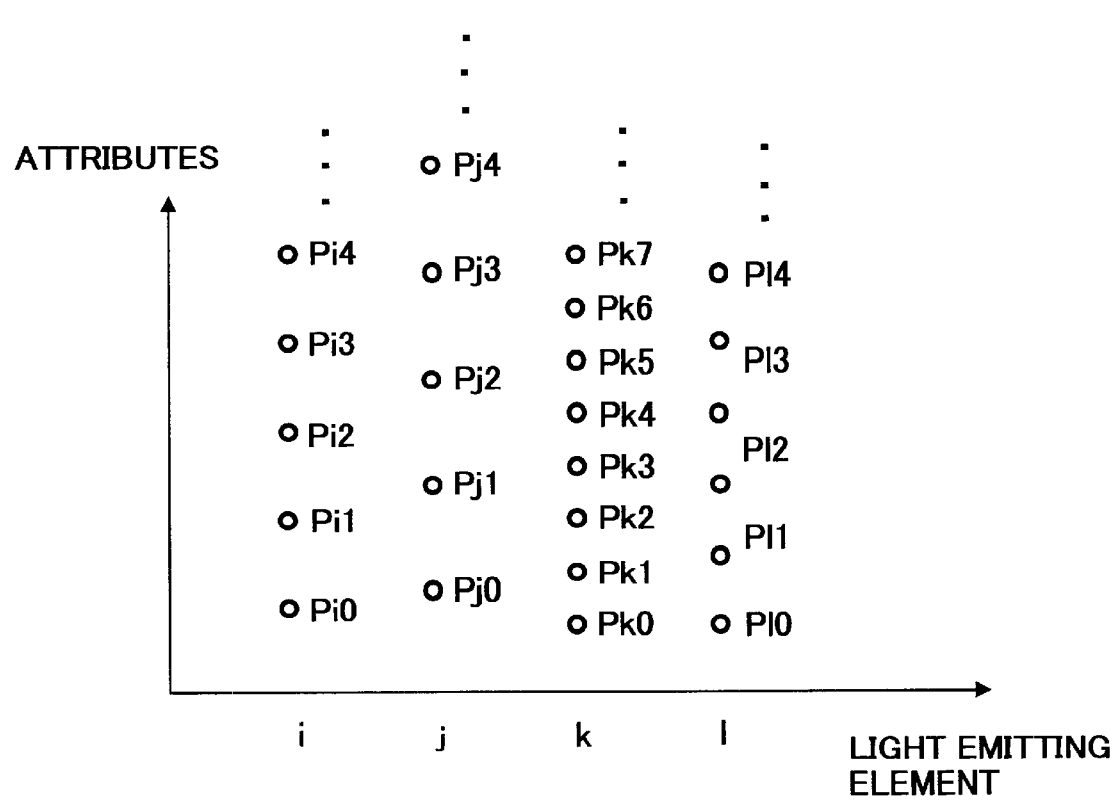
FIG. 23 is a chart for illustrating a relation between attribute and a correction value utilized in the process of FIG. 21.

From these correlation curvatures of light emitting elements i, j, k, •, attributes Piq, Pjq, Pkq may be found from an optional correction value q (FIG. 23) so that the following formula can be valid.

$$Piq = ai \times q + bi$$

$$Pjq = aj \times q + bj$$

$$Pkq = ak \times q + bk$$

$$\vdots$$

In steps S1-3 and S1-4, computing and processing may be performed from such a result so that comparison values obtained from the attributes of the plurality of light emitting elements in the earlier described manner can be suppressed within a prescribed range over the entire valid image region. Then, a desirable correction value may be found for each light emitting element. Such computing and processing are described below in more detail.

Figure 24:
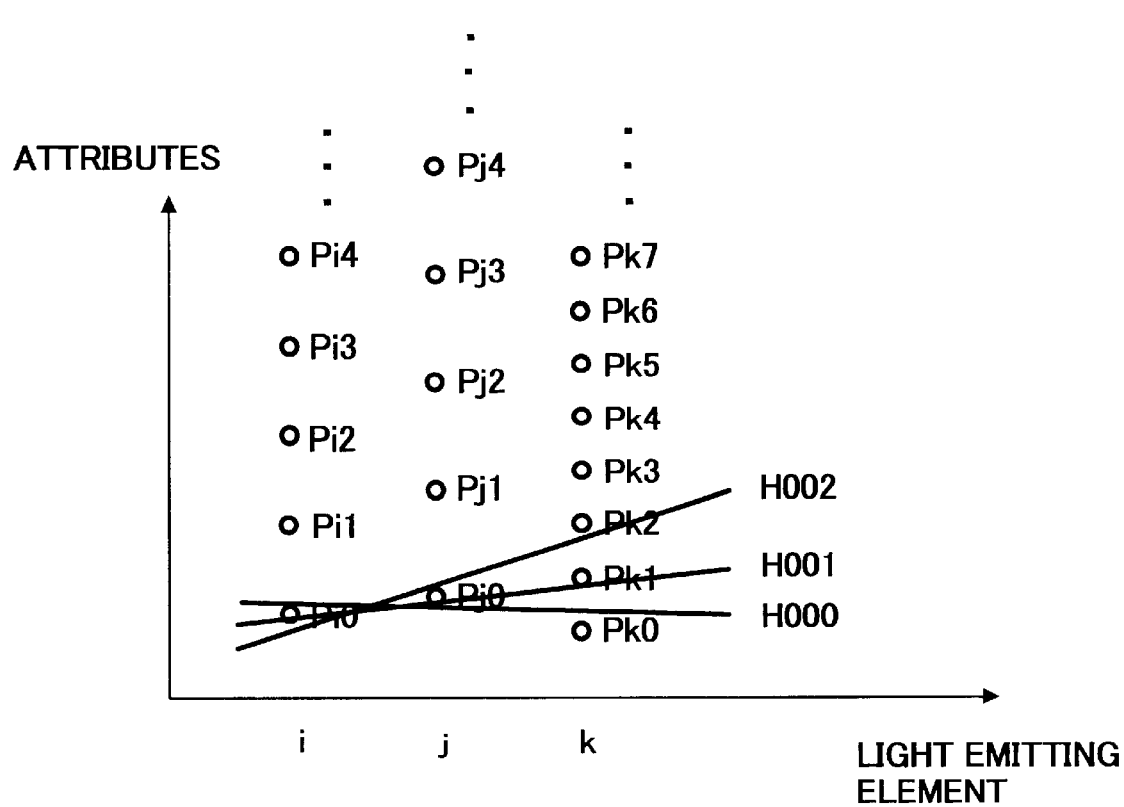
FIG. 24 is a chart drawn by writing inclinations of the approximation linear lines into FIG. 23.

For the purpose of ease, it is premised that a comparison value obtained from attributes of exposure intensity distributions of a plurality of light emitting elements may be an inclination of the approximation linear line that is obtained from attributes (plots) using a least squares approximation principle per a unit of three light emitting elements. Specifically, an inclination of the approximation linear line may be found from three attributes Piu, Pjv, and Pkw for light emitting elements I, J, and k, and is referred to as Huvw, wherein the reference numeral (u) represents a correction value for a light emitting element (i), the reference numeral (v) represents a correction value for a light element (j), and the reference numeral (w) represents a correction value for a light element (k). Specifically, the reference numeral H000 may be inclination of the approximation linear line with regard to Pio, Pjo, and Pko. The reference numeral H001 may be inclination of the approximation linear line with regard to Pio, Pjo, and Pk1. The reference numeral H002 may be inclination of the approximation linear line with regard to Pio, Pjo, and Pk2 as illustrated in FIG. 24. In this way, all of Huvw may be found by varying each of the u, v, and w from 0 to 15.

Then, when a prescribed value range may be from HL to HH, for example, a combination of correction values u, v, and w that can establish the following formula may be sought.

$$HL \cdot Huvw \cdot HH$$

Subsequently, the similar processing may be performed after shifting a unit of the light emitting elements by one to light emitting elements j, k, and l, and a correction value enabling Hvwx to be suppressed within a prescribed range may be newly sought, wherein the reference numeral x represents a correction value for the light element 1. Correction values for light emitting elements which can satisfy the above-described relation over the entire valid image region may be found. Specifically, a light emitting quantity for each light emitting element can accordingly be found.

In addition, when finding an attribute with regard to a correction value in step S1-2, a correlation curvature can have a high precision if an increased number of correction values are given. However, a certain period of time may be required for these measurements. Thus, it is desirable to grasp how correlated a correlation curvature is. In addition, if an attribute with regard to a correction value can approximates the linear line, only two correction values are enough to be given to find an attribute. If it does not approximates the linear line, it is necessary to get a correlation curvature by giving three or more correction values. In practice, from two to four correction values may be desirable. In addition, if an exposure width (LSF) or the like is selected as an attribute, it is advantageous to increase the measurement speed by measuring a one-dimensional exposure intensity distribution using a prescribed slit or the like.

Figure 25:
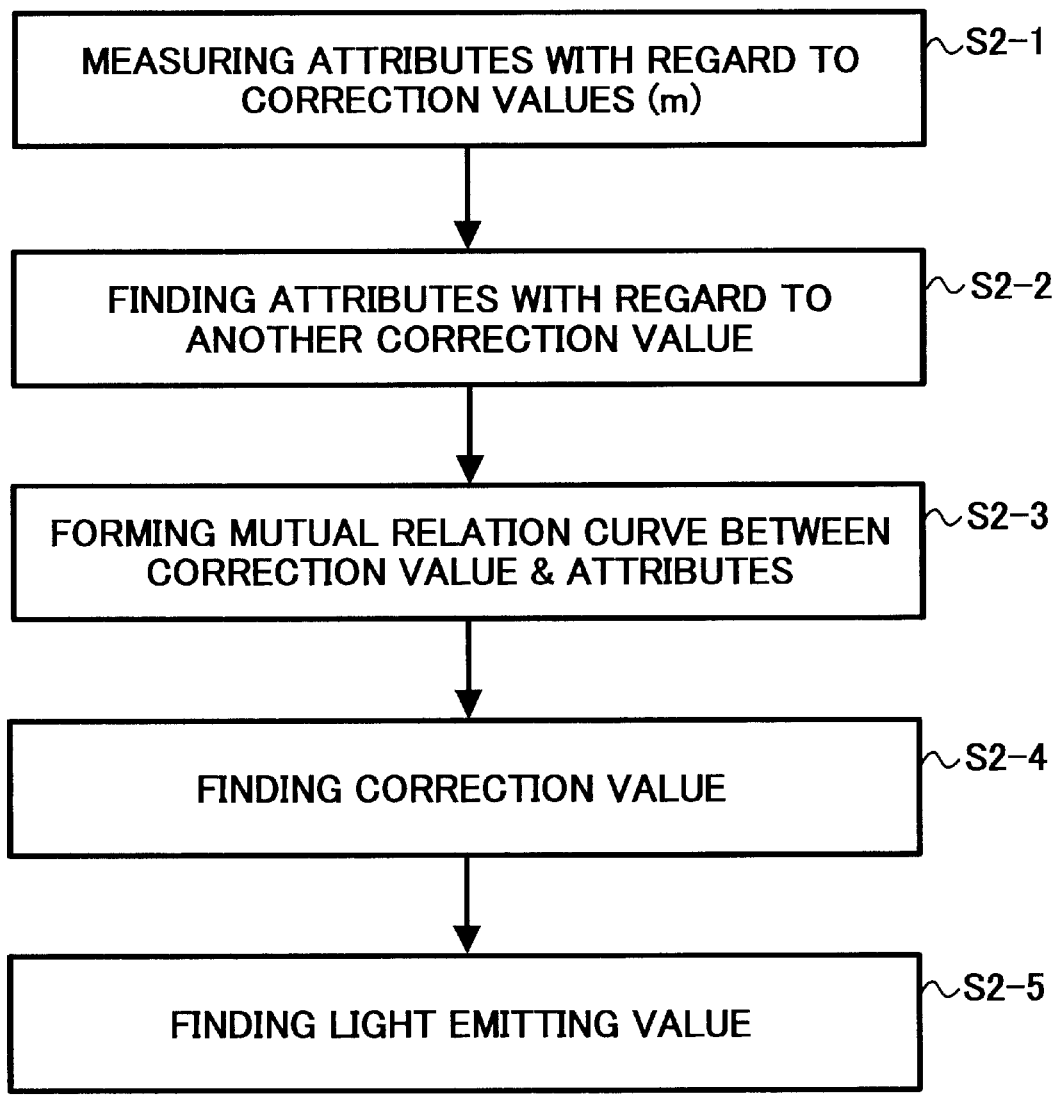
FIG. 25 is a flowchart for illustrating a control procedure of the second control example of the correcting process.

The second exemplary control is now described with reference to FIG. 25 wherein a procedural operation is illustrated. In this process, to find prescribed attribute in an exposure intensity distribution after giving one correction value (m) to each light emitting element so as to generate a light, a two dimensional exposure intensity distribution may again be obtained and measured by the two-dimensional CCD or similar devices in step S2-1. Since a driving current for driving an LED and a light emitting quantity are in a proportional relation, if a fluctuation amount of a driving current corresponding to one bit of a correction value is known, a fluctuation amount of the light emitting quantity per one bit of the correction value can also be found.

In such a situation, if a fluctuation rate of the light emitting quantity (i.e., a proportional constant between a driving current and a light emitting quantity) of each light emitting element is equal, no problem occurs. However, the proportional constant may practically be different per a light-emitting element. Accordingly, each of proportional constants may necessarily be measured before hand. In such a situation, it is conventionally checked if an LED emits a light or not in a wafer state in the inspection process called the PROVING TEST when LED array chips are manufactured. Specifically, a prescribed kind of a driving current is generally given and a light is generated. Then, the LED array chips are categorized and/or sorted into ranks based upon a light emitting quantity.

However, if two kinds of a driving current are given and lights are accordingly emitted, a proportional constant between a driving current and a light emitting quantity can be found per a light emitting element and data thereof can be reserved for later use. For this purpose, an attribute with regard to a correction value other than the correction value (m) used in step S2-1 may be sought in step S2-2.

Figure 26:
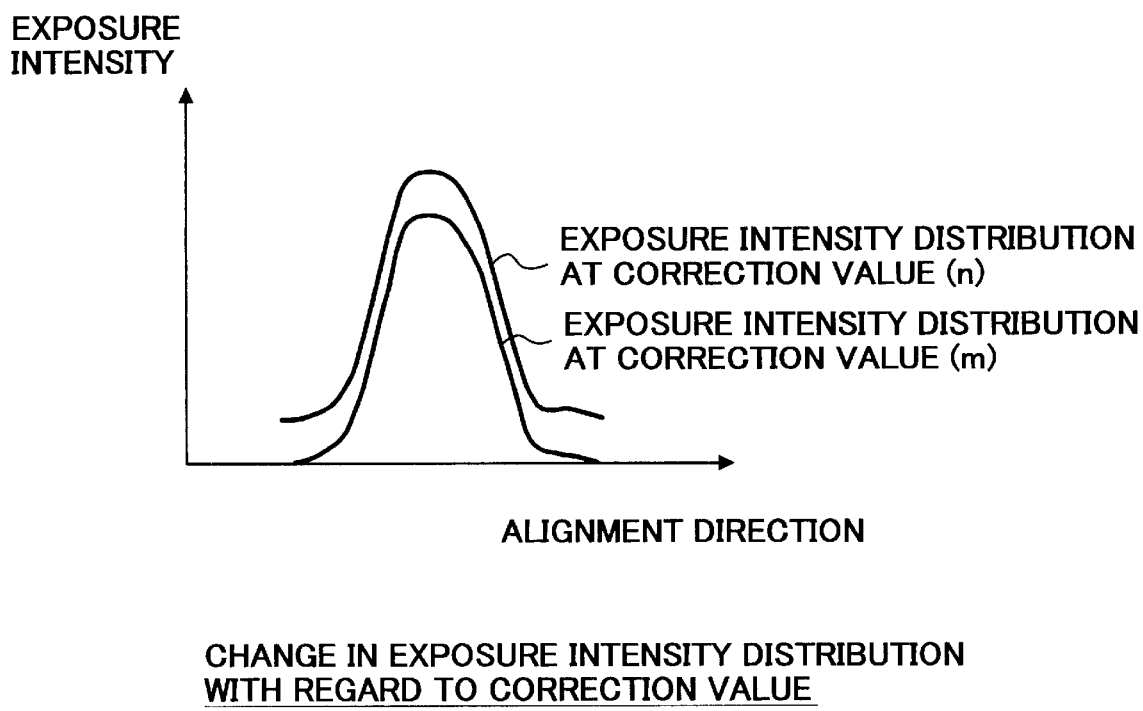
FIG. 26 is a model chart for illustrating exposure intensity distributions at the cross section in the aligning direction when correction value (m) and another correction value (n) are given.
Figure 27:
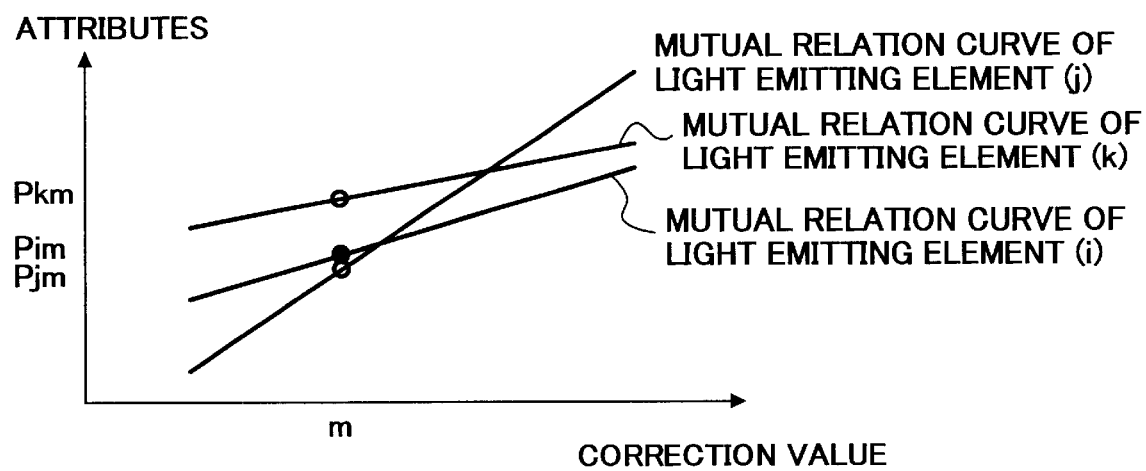
FIG. 27 is a chart for illustrating correlation curvatures formed by the process of FIG. 25.

In addition, even when the light emitting quantity fluctuates, a shape of the exposure intensity distribution itself does not change, i.e., only the exposure intensity changes as illustrated in FIG. 26, wherein cross sections in the aligning direction of exposure intensity distributions obtained when correction values (m) and (n) are given are illustrated. Accordingly, when the exposure intensity distribution corresponding to one correction value (m) is measured, an exposure intensity distribution corresponding to an optional correction value can be found through a prescribed calculation. Also, the attribute in the exposure intensity distribution can be found. As a result, a correlation of a correction value and an attribute may be formed as illustrated in FIG. 27 in step S2-3. According to the above-described method, measurement with respect to only one correction value may be enough.

Otherwise, to avoid measuring a proportional constant between the driving current and the light emitting quantity, two correction values are given to a light emitting element so as to emit lights in a similar manner to that described in the first control. In addition, a two dimensional intensity distribution may be obtained and measured to find prescribed attributes in the exposure intensity distributions corresponding to two correction values. Since there exists a proportional relevance between a driving current and a light emitting quantity, a two dimensional intensity distribution for another correction value (x) can be calculated and found from the two dimensional intensity distributions of these two correction values (i.e., two kinds of a driving current). Thus, an attribute can be found in the exposure intensity distribution, and accordingly, a correlation curvature of a correction value and an attribute can be formed per an LED in step S2-3.

In any case, based upon the correlation curvature found in the above-described manner, computing and processing may be performed so that a comparison value obtained from attributes of a plurality of light emitting elements can be suppressed within the prescribed range over the entire valid image region. As a result, a correction value, i.e., a light emitting quantity for each light emitting element can be found in steps S2-4 and S2-5. A subsequent computing and processing method can be performed in a similar manner to that described in the first exemplary control. According to such a method, since attributes with regard to all correction values can be derived from exposure intensity distributions, a highly precise correlation curvature can be acquired.

Figure 28:
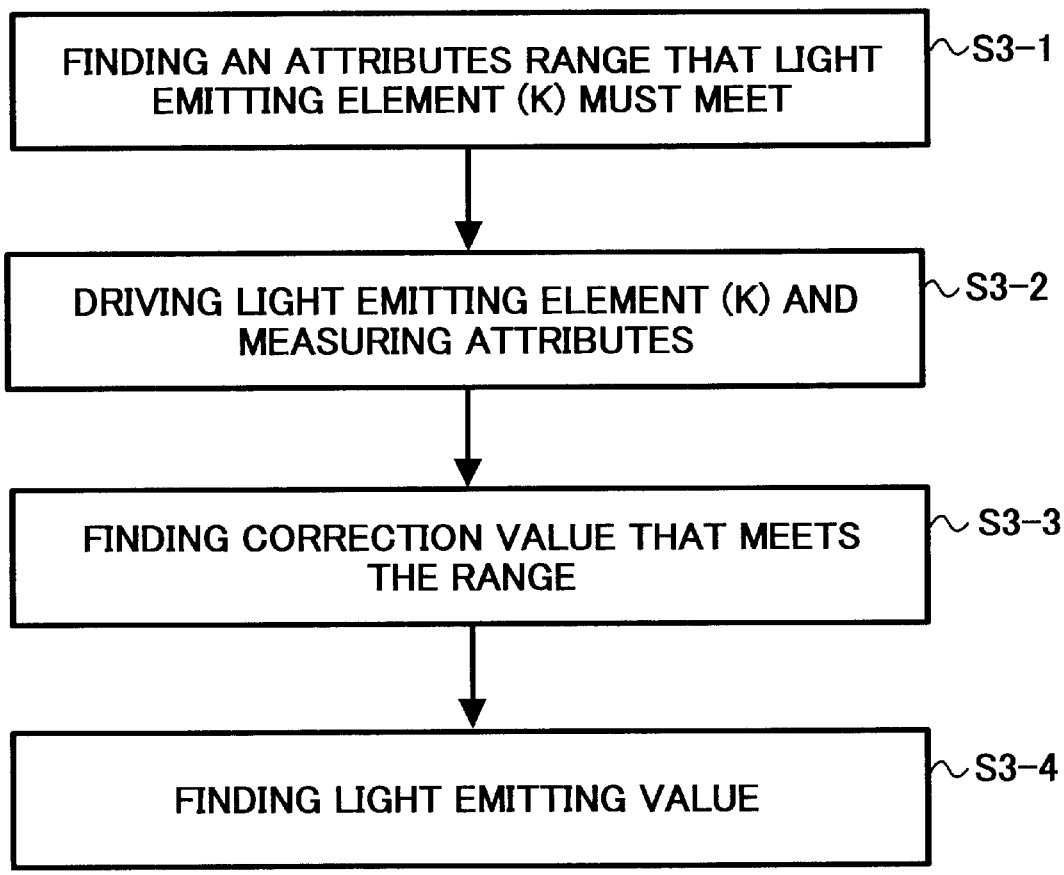
FIG. 28 is a flowchart for illustrating a control procedure of the third control example of the correcting process.

The third exemplary control is now described with reference to FIG. 28 where a procedural operation is illustrated. This control example may sequentially determine a correction value with regard to each light emitting element instead of previously measuring attributes with regard to prescribed correction values.

The method is premised upon one or more correction values being determined up to the light emitting element (k−1). Subsequently, a range of attribute that a correction value unknown light emitting element k can take (so as to enable a comparison value obtained from attributes of (s) items of light emitting elements of from (k−s+1) to (k) to be suppressed within a prescribed range) may be determined referring to attributes of (s−1) items of light emitting elements of from (k−s+1) to (k−1) in step S3-1. After that, the light emitting element k emits a light, and attributes corresponding to the correction value may be measured in step S3-2. A desirable correction value that should satisfy the attribute range may then be found in step S3-3. If a plurality of correction values can satisfy the attribute range to be taken, the most preferable correction value can be selected. By repeating such an operation one after another, and determining correction values over the entire valid image region, each light emitting quantity can be found in step S3-4.

One example of the above-described process is described below in more detail.

For the purpose of ease, it is premised that a comparison value obtained from attributes of a plurality of light emitting elements may be an inclination of the approximation linear line obtained from attributes using a least squares approximation principle per a unit of three light emitting elements. In the above, alphabetical references i, j, and k may be put to the three light emitting elements, respectively. Desirable correction values for two light emitting elements i, and j have been already determined, and corresponding attributes are referred to as Pi and Pj. Then, a range of an attribute that the light emitting element k should take may be found from these attributes of the light emitting elements i and j so that an inclination H of an approximation linear line with regard to the three light emitting elements can be suppressed within a prescribed range, for example, from HL to HH. Such a range may correspond to that of an attribute from PL to PH.

Figure 29:
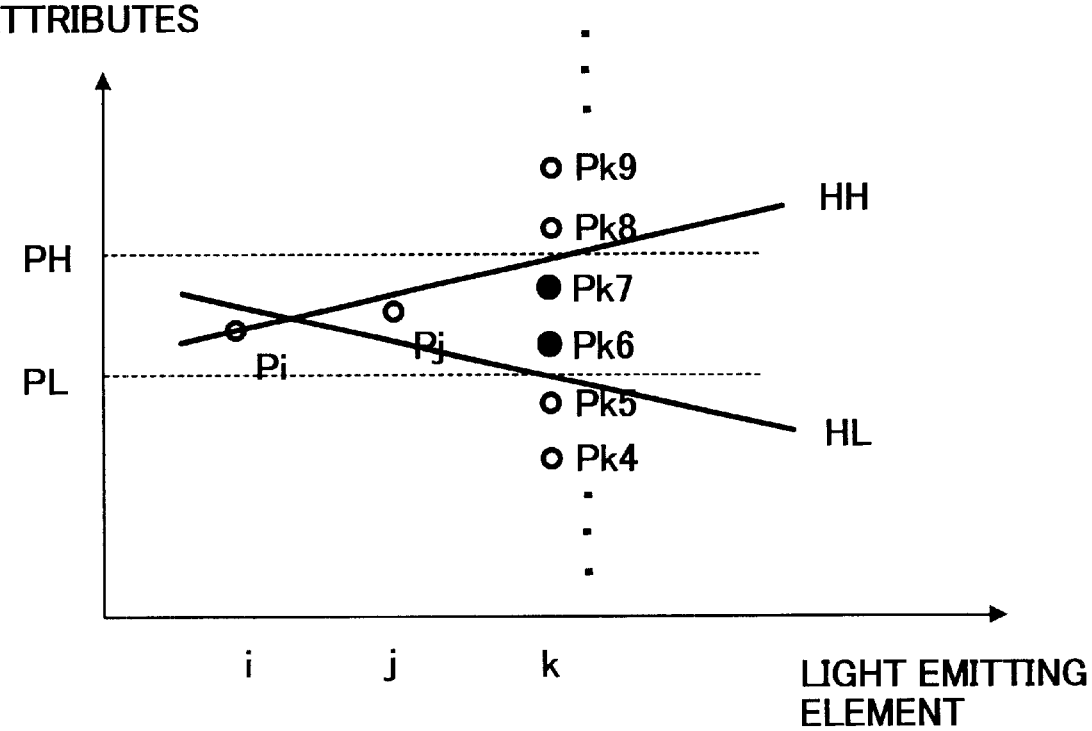
FIG. 29 is a chart for illustrating a range of attribute that the next light emitting element has to take in the process of FIG. 28.

Then, one or more dummy correction values are given to the light emitting element k so as to emit one or more light beams therefrom to find a desirable correction value whose attribute satisfies the range of from PL to PH together with the known attributes as illustrated in FIG. 29. Then, one or more attributes corresponding to one or more correction values may be measured, and a desirable correction value may be determined among them. In the case of FIG. 29, preferable correction values may be 6 or 7. When there exists a plurality of applicable correction values, a correction value cross to either zero or an inclination H' (not shown) of the approximation linear line found from the attribute of the light emitting elements (i−1), i, and j can be selected. By repeating such an operation, correction values can be determined over the entire valid image region. In addition, the correction values of up to the (s−1) light emitting elements may have preferably also been determined from the above-described method.

Thus, the correction value of the second light emitting element may be determined based upon the attribute of the first light emitting element. The correction value of the third light emitting element may be determined based upon the attribute of the first and second light emitting elements. Subsequent to those, the correction value of up to the (s−1) light emitting element may preferably be determined based upon the attribute of the precedent light emitting elements. Since a correction value is found from one or more former light emitting elements one by one in such a manner, it is supposed that an inappropriate value can be found along as going back word. In such a case, an additional treatment can be performed. For example, the attribute Pk to be taken by the light emitting element k may be designed not to largely deviate from the attribute P1 of the first light emitting element so that the following inequality can be valid, for example:

$$0.8 \times P1 \bullet Pk \bullet 1.2 \times P1$$

In any one of embodiments, the light emitting quantity is changed by controlling a driving current with a correction value. However, since controlling a light emitting time period changes the light emitting quantity, the light emitting time period can be controlled by a correction value. In addition, the combination of a driving current and a light emitting time period can control the same. The correction value to be given to the above-described each light emitting element is stored in the internal or external (e.g. an image forming apparatus) ROM of the optical writing unit. When the ROM is included in the optical writing unit, the light emitting element array 100 may be controlled and driven with a light emitting quantity based upon its correction value. On the other hand, when the ROM is externally provided, the light emitting element array 100 may be controlled and driven with a light emitting quantity based upon an externally transmitted correction value.

When a correction value is stored in the interior ROM of the optical writing unit, a driving current may be particularly preferably controlled by the correction value. Simultaneously, an output image signal transmitted to the optical writing unit can be acquired by applying image processing to the input image signal and controlling a light emitting time period.

If control is performed as in the first to third examples, each light emitting element can be driven and a fine image can be obtained. This is again because the comparison value obtained from comparison of the attributes of exposure intensity distributions of a plurality of light emitting elements can be suppressed within a prescribed range over the entire valid image region. In particular, when a driving method as illustrated in FIGS. 21, 25 and 28 of flowcharts is adopted, each light emitting element can be driven while density unevenness is not noticeable, thereby a fine image is obtained. It is quite different from the conventional light intensity quantity constant correction and spot radius constant correction or the like.

Correction control performed in accordance with an image formation condition is now described. There exist a various image forming conditions in an image forming apparatus as described in the following embodiment. Accordingly, a best-suited exposure, such as exposure avoidable from recognition of density unevenness in an image, may be necessary in accordance with an image forming condition. Specifically, a process is adjusted in the image forming apparatus when an electrical power source is supplied and in accordance with a preset value such as a number of outputs. For example, a developing characteristic is grasped by measuring a toner adhering amount on a PC member or transfer belt with regard to an exposure condition, and a condition of a process such as charging, exposing, developing, and transferring may be adjusted. In addition, an image forming condition may be differentiated in accordance with a type of a recording sheet in the transferring and/or fixing processes. Accordingly, the best-suited exposure may be required in accordance with its image formation condition in response to a change in a condition for an image formation (i.e., process required in an electro-photographic process such as charging, exposing, developing, transferring, and fixing).

Figure 30:
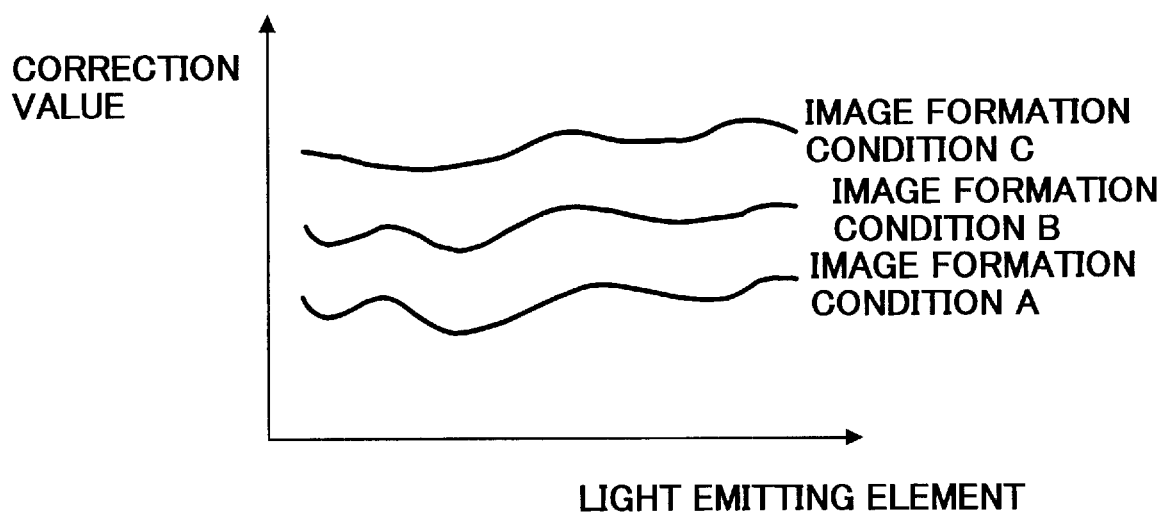
FIG. 30 is a chart for illustrating a relation between a correction value and an image formation condition.
Figure 31:
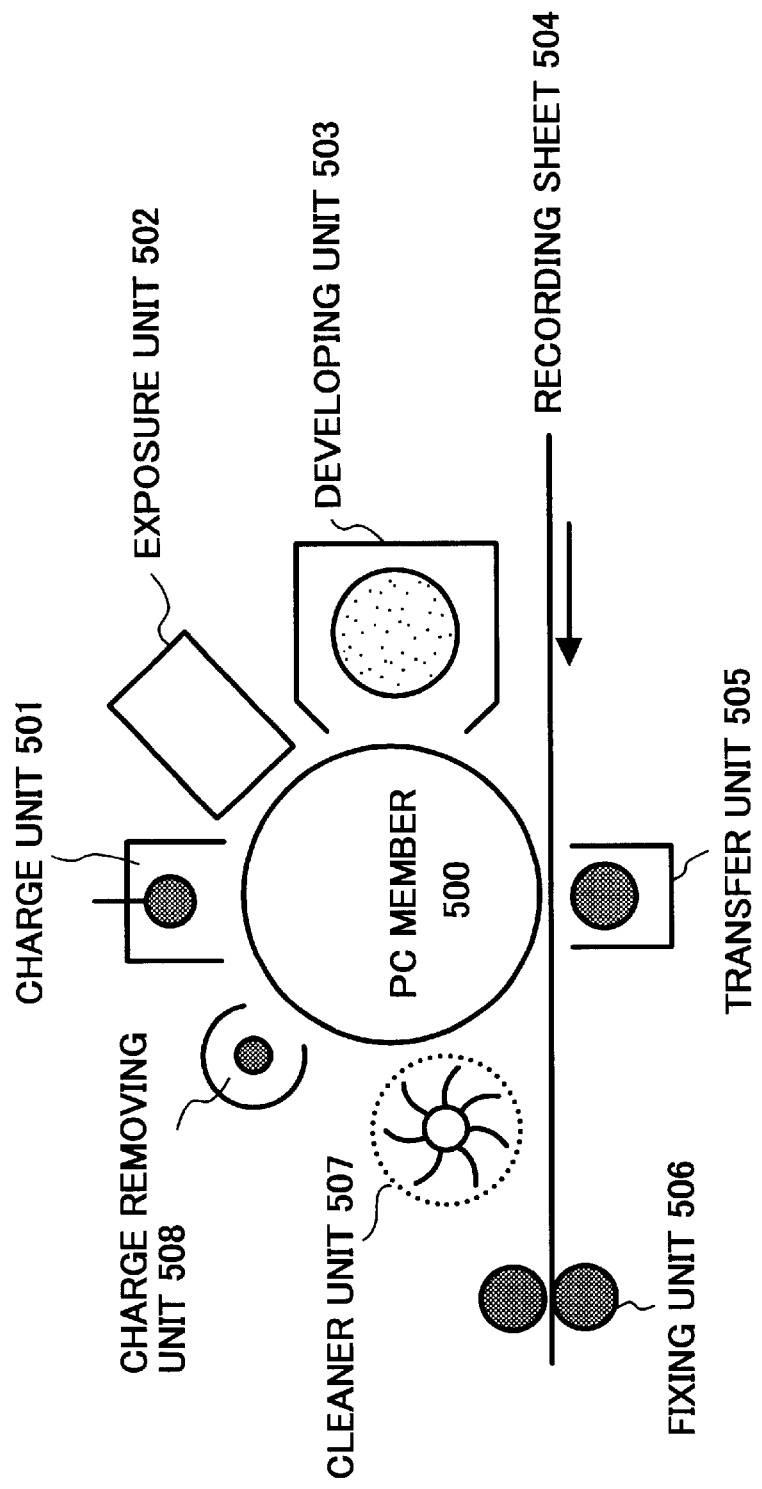
FIG. 31 is a schematic configuration chart for illustrating an image forming apparatus that forms a mono color image.

A different image formation condition is exemplified in FIG. 30. Specifically, image formation conditions are divided into several groups A, B, and C. Then, to avoid recognition of density unevenness (i.e., longitudinal line) in each of the image formation conditions divided into such groups, a prescribed correction value may be set to an optical writing unit so as to enable a comparison value of attributes in exposure intensity distributions of a plurality of light emitting elements to be suppressed within a prescribed range over the entire valid image region. Thus, a correction value (i.e., a light emitting quantity) given to each light emitting element at the time may be determined. In addition, the correction value may be stored in the ROM provided in the optical writing unit or the externally provided ROM per an image formation condition divided into the groups. Then, each light emitting element may be controlled and driven by selecting a correction value in accordance with an image formation condition selected by an image formation condition determining device (not shown). In addition, an image formation condition may be changed in accordance with an environment condition, in particular, temperature and humidity. For example, a condition of an image formation such as transferring and fixing may be changed depending upon the temperature and humidity, in particular, a charge amount of toner may be changed depending upon the humidity. Accordingly, it is required that the best-suited exposure is performed in accordance with an environment condition.

An exemplary control under a different environment condition is now described. Environment conditions may be divided into several groups. For example, these may be divided into a high temperature and humidity condition (e.g., higher than 30° C., more than 70%), a room temperature and humidity condition (e.g., from higher than 10° C. to less than to 30° C., from more than 20% to less than 70%), and a low temperature and humidity condition (e.g., less than 10° C., less than 20%). In each of these environment conditions, to avoid recognition of density unevenness in an image (i.e., a longitudinal line), a correction value may be set to an optical writing unit so as to enable a comparison value obtained from attributes of exposure distributions of a plurality of light emitting elements to be suppressed with in a prescribed range over the entire valid image region. Then, a correction value (i.e., a light emitting quantity) may simultaneously be determined for each light emitting element. Then, the correction value may be stored in either internal or external ROM of the optical writing unit per a temperature condition. After that, a correction value may be selected by the temperature condition determining device (not shown) in accordance with a temperature condition. Then, each light emitting element may be controlled and driven. In addition, in practice there exists evenness caused by unevenness of a mechanical parts such as a gap between a PC member and an optical writing unit and/or an assembling unevenness per an image forming apparatus that mounts the optical writing unit. As a result, an image formation condition may be changed. Thus, the best-suited exposure may necessarily be performed in accordance with the mechanical unevenness condition.

Exemplary control performed when a mechanical unevenness condition exists is now described. Mechanical unevenness conditions may be divided into several groups. To avoid density unevenness (e.g. a longitudinal line) in each of the unevenness conditions divided into several groups, a prescribed correction value may be set to an optical writing unit so as to enable a comparison value obtained from attributes in exposure intensity distributions of a plurality of light emitting elements to be suppressed within a prescribed range over the valid image region. Then, a correction value (e.g. a light emitting quantity) given to each light emitting element can simultaneously be determined. Accordingly, when the correction value is stored either in the internal or external ROM of the optical writing unit per an image formation condition, and one of a set of correction values is selected by the image formation condition determining device in accordance with the image formation condition, each light emitting element may be controlled and driven.

The above-described grouping may be performed per an image formation condition such as an environment condition, and a correction value given to each light emitting element may simultaneously be determined in accordance with the group. However, if a correction value given to each light emitting element is not different, the grouping can be neglected. For example, environment conditions may be divided into three groups in the above-described example. However, if a correction value given to each light emitting element is substantially the same in cases of the room temperature and humidity condition, and low temperature and humidity condition, conditions may be sufficient to be divided into only two groups, e.g., a high temperature and humidity condition (higher than 30° C., more than 70%), and a room temperature/humidity and low temperature/humidity condition (less than to 30° C., less than 70%).

As one of image formation processes in an image forming apparatus, there exists an electro-photographic process. An outline of the electro-photographic process may be now described. An electric potential may be given to an image carrier (a PC member) 500 by a charge unit 501 in a charging process. By irradiating a light spot from an optical writing unit (i.e., an exposure unit) 502 onto the image carrier 500, a latent image is formed in an exposing process. A toner image is formed by a developing unit 503 while adhering toner to the latent image in a developing process. The toner image is transferred onto a recording sheet 504 by a transfer unit 505 in a transfer process. The toner image is fusion bonded to the recording sheet 504 while a pressure and/or heat is applied to in a fixing process. In addition, toner remaining on the PC member 501 is cleaned by a cleaner unit 507, and a charge on the charge section of the PC member 501 is removed by a charge removing unit 508. Thus, processes of from charging to charge removing form one process cycle.

Figure 32:
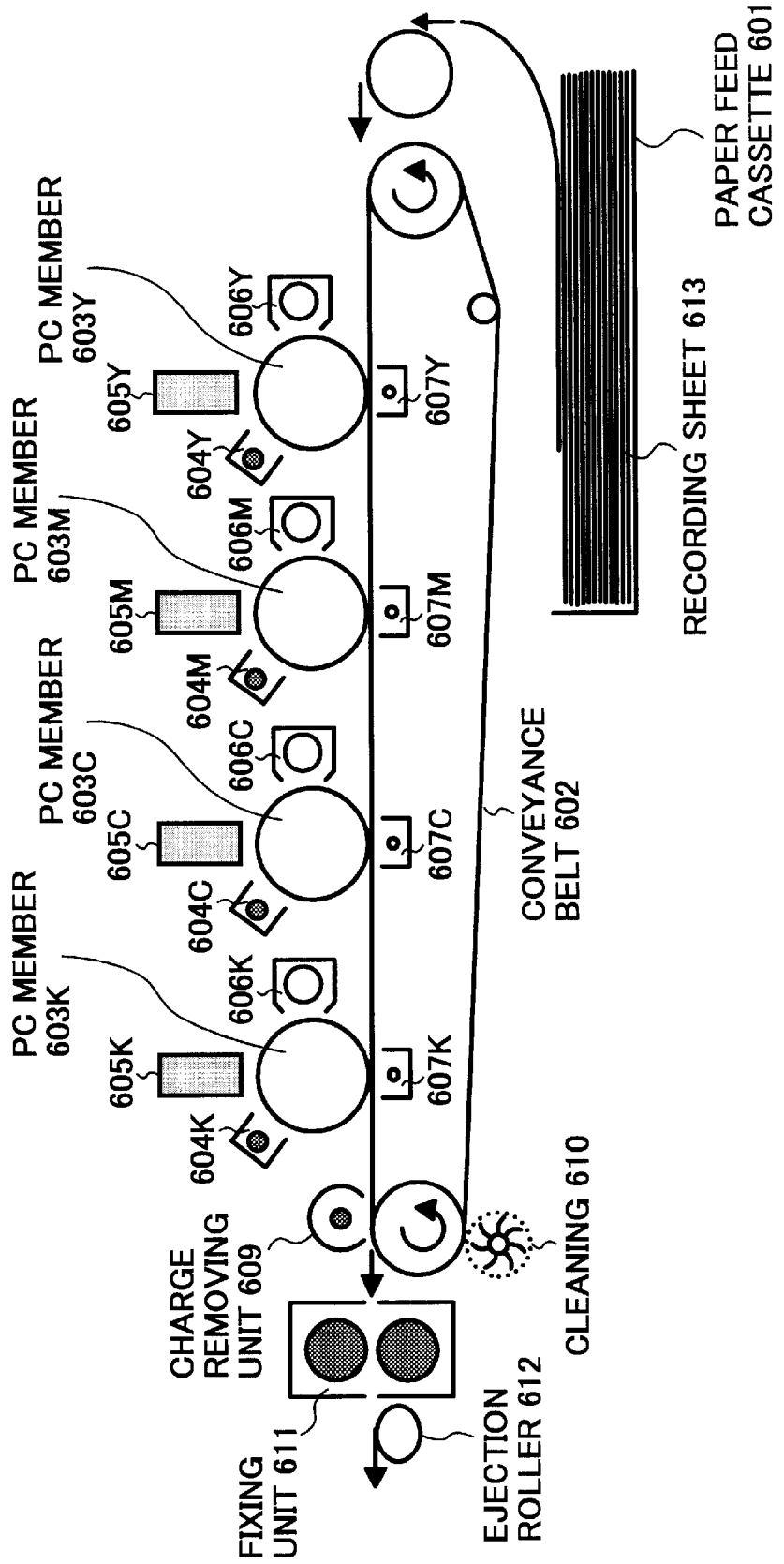
FIG. 32 is a schematic configuration chart for illustrating an image forming apparatus of a tandem type.

An image forming apparatus of a tandem type that is advantageous for a high-speed color image output is illustrated in FIG. 32.

A sheet cassette 601 may be arranged in a horizontal direction in the bottom of the apparatus. Also, a conveyance belt 602 may be provided so as to convey a transfer sheet 613 fed from the sheet cassette 601. Each of yellow (Y), magenta (M), cyan (C), and black (K) use PC members 603Y, 603M, 603C, and 603K may be arranged on the conveyance belt one after another from upstream at substantially the same interval. A plurality of process members complying with an electro-photographic process are arranged in sequence around these PC members 603Y, 603M, 603C, and 603K. These process members, for example, for the PC member 603Y may be a charging unit 604Y, an exposure unit 605Y, a developing unit 606Y, and a transferring unit 607 or the like. It is similar for other PC members 603M, 603C, and 603K.

In addition, a charge removing unit 609 and a cleaning unit 610 or the like may be arranged downstream of the PC member 603K in the surrounding of the conveyance belt 602. In addition, a fixing unit 611 may be arranged downstream in a conveyance direction of the charge removing unit 609, and connected to an ejection tray (not shown) via an ejection roller 612.

When a multi color mode is selected, for example, in such a tandem type image forming apparatus, a latent image may be formed on each PC member 603Y, 603M, 603C, and 603K when each exposure unit 605Y, 605M, 605C, and 605K exposes in accordance with a corresponding color image signal. These latent images may then be developed by corresponding color toner and become toner images. These toner images may electro-statically be absorbed onto a same portion of the transfer belt 602, and subsequently, transferred onto the transfer sheet, thereby the toner images are superimposed thereon. Then, it may be fixed as a full color image and ejected.

As an exposure unit 502, 605Y, 605M, 605C, and 605K of such an image forming apparatus, an optical writing unit according to the present invention is applied to. Since the optical writing unit according to the present invention is designed so that a preferable image (i.e., a longitudinal line is not noticeable) can be acquired, an image forming apparatus capable of outputting a preferable image can be obtained.

Figure 33:
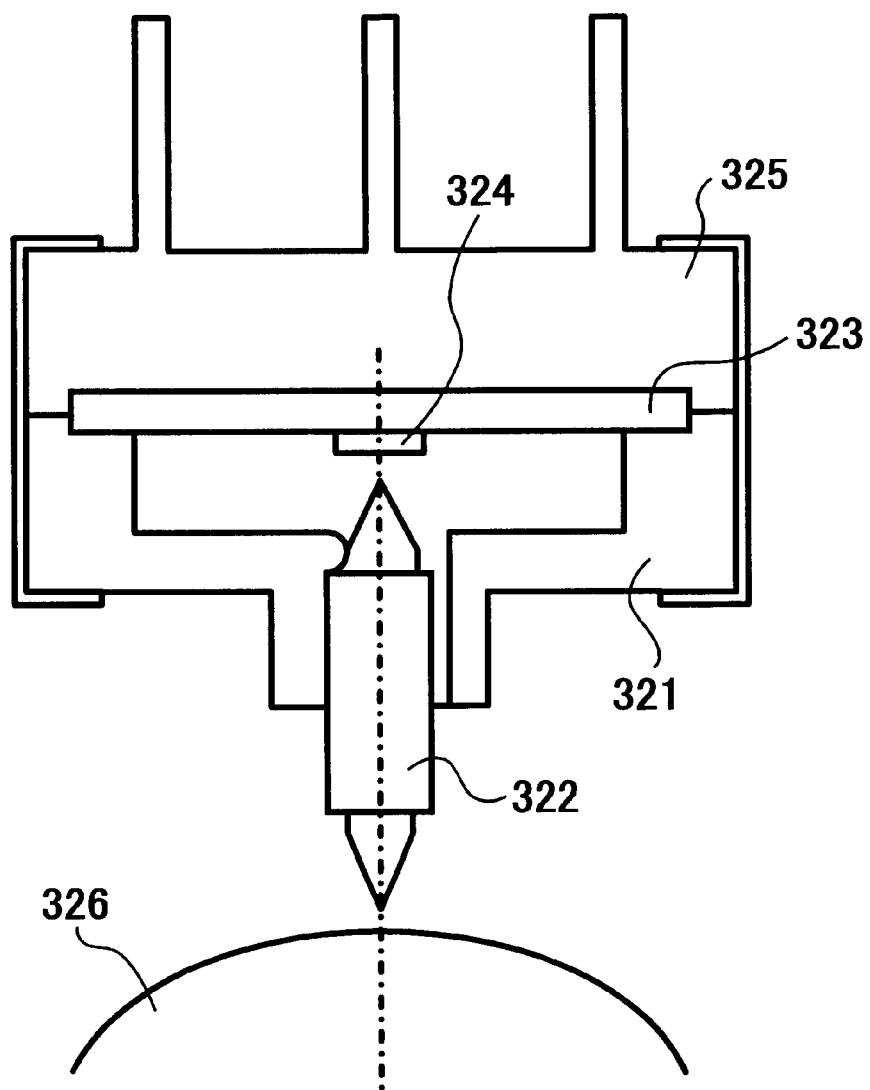
FIG. 33 is a schematic configuration chart for illustrating both an optical writing unit employing a refraction index distribution type rod lens array and an image carrier.

In addition, a unit employing a roof prism lens array as illustrated in FIG. 18 is utilized as an optical writing unit. Beside that, an optical writing unit employing the earlier described refraction index distribution type rod lens array can be utilized. The optical writing unit employing the earlier described refraction index distribution type rod lens array may be basically constructed by the rod lens array 322 supported by a frame 321 as illustrated in FIG. 33, a base plate 323 supported by the rear end (upper end in the drawing) of the frame 321, a light emitting element array (LED) 324 mounted on the base plate 323, and a heat sink 325 having a function of heat release and supporting the base plate 323 with the frame 321. The rod lens array 322 may be arranged such that an optical axis of each rod lens is aligned with an optical axis of each light emitting element of the light emitting element array (LED) 324, and an optical writing portion on the image carrier 326 becomes an imaging surface of a lower side surface (i.e., the side not opposing the light emitting element array 324) of the rod lens array 322. It is not particularly described. However, similar to the optical writing unit 400 employing the roof prism lens array 401 illustrated in FIG. 18, a position of the rod lens array 322 with regard to the light emitting element array 324 can be adjusted by providing a positional adjustment mechanism for the rod lens array 322. Thus, a comparison value obtained from comparison of the attributes in exposure intensity distributions of the plurality of light emitting elements can be suppressed within a prescribed range over the entire valid image region.

The mechanisms and processes set forth in the present invention may be implemented using one or more conventional general purpose microprocessors and/or signal processors programmed according to the teachings in the present specification as will be appreciated by those skilled in the relevant arts. Appropriate software coding can readily be prepared by skilled programmers based on the teachings of the present disclosure, as will also be apparent to those skilled in the relevant arts. However, as will be readily apparent to those skilled in the art, the present invention also may be implemented by the preparation of application-specific integrated circuits by interconnecting an appropriate network of conventional component circuits or by a combination thereof with one or more conventional general purpose microprocessors and/or signal processors programmed accordingly. The present invention thus also includes a computer-based product which may be hosted on a storage medium and include, but is not limited to, any type of disk including floppy disks, optical disks, CD-ROMs, magnet-optical disks, ROMs, RAMs, EPROMs, EEPROMs, flash memory, magnetic or optical cards, or any type of media suitable for storing electronic instructions.

Numerous additional modifications and variations of the present invention are possible in light of the above teachings. It is therefore to be understood that within the scope of the appended claims, the present invention may be practiced otherwise than as specifically described herein.

What is claimed is:

1. An image forming apparatus, comprising:
   a light emitting array having a plurality of light emitting elements configured to emit light beams to form an image;
   an imaging element array configured to perform imaging with the light beams on a prescribed plane;
   an exposure intensity distribution detecting device configured to detect and form a three dimensional exposure intensity distribution for each of the light beams;
   an attribute obtaining device configured to obtain a prescribed attribute from each of the exposure intensity distributions; and
   a comparison value obtaining device configured to obtain a comparison value from a unit comprising a succession of two or more of the attributes;
   wherein said light beams are emitted by the image forming apparatus so that the comparison values for an entire exposure valid region fall within a prescribed range.

2. The image forming apparatus according to claim 1, wherein said comparison values for the entire exposure valid region are obtained by changing the unit in an optical aligning direction.

3. The image forming apparatus according to claim 1, wherein said prescribed range suppresses density unevenness in the image to a predetermined amount.

4. The image forming apparatus according to claim 3, wherein said attribute is obtained from a two dimensional light intensity distribution obtained as a cross section of the three dimensional exposure intensity distribution in a direction either parallel to or orthogonal to an alignment of the light emitting elements.

5. The image forming apparatus according to claim 4, wherein said two dimensional light intensity distribution is obtained by accumulating exposure light intensities of the three dimensional exposure intensity distribution in the direction either parallel to or orthogonal to the alignment of the light emitting elements.

6. The image forming apparatus according to claim 1, further comprising:
   a positional relation adjusting device configured to adjust a positional relation between the light emitting element array and the imaging element array based upon the comparison value so that the comparison value falls within the prescribed range.

7. The image forming apparatus according to claim 6, wherein said positional adjustment is performed by displacing the imaging element array by a prescribed amount toward a defocus position.

8. The image forming apparatus according to claim 1, further comprising:
   a correction value determining device configured to determine a prescribed correction value for driving each of the light emitting elements so that said comparison values for the entire exposure valid region fall within the prescribed range.

9. The image forming apparatus according to claim 8, wherein said attribute is obtained from a prescribed correlation between a correction value and the attribute of the exposure intensity distribution of the light beam generated in response to the correction value.

10. The image forming apparatus according to claim 9, wherein said prescribed correlation is a linear line.

11. The image forming apparatus according claim 8, wherein one bit of said correction value is predetermined and stored in a memory by giving two levels of a driving current to one or more of the light emitting elements and obtaining a proportional constant between the driving current and a light emitting quantity.

12. The image forming apparatus according to claim 8, wherein said correction value determining device is a computing and processing device.

13. The image forming apparatus according to claim 12, wherein said computing and processing device finds a relation between a light emitting quantity and the exposure intensity distribution for each of the light emitting elements.

14. The image forming apparatus according to claim 12, wherein said computing and processing device determines a range of the attribute for one of the light emitting elements based upon one or more of the attributes of other ones of the light emitting elements.

15. The image forming apparatus according to claim 8, wherein said correction values are determined for an image formation condition or an environment and stored in a storing device to be selectively utilized.

16. The image forming apparatus according to claim 1, wherein said attribute is an exposure width of a two dimensional light intensity distribution at a prescribed threshold.

17. The image forming apparatus according to claim 1, wherein said attribute is an exposure area of the three dimensional exposure intensity distribution at a prescribed threshold.

18. The image forming apparatus according to claim 1, wherein said comparison value is an inclination of an approximation linear line obtained from said unit comprising the succession of two or more of the attributes.

19. The image forming apparatus according to claim 1, wherein said comparison value is a difference in an exposure area average of said unit comprising the succession of two or more of the attributes.

20. The image forming apparatus according to claim 1, wherein said imaging element array is integrally molded.

21. A method for optically writing an image, comprising the steps of:
    emitting a light beam from a light element array comprising light emitting elements;
    imaging with an imaging element array;
    obtaining three dimensional exposure intensity distributions from the light emitting elements;
    obtaining a prescribed attribute for each of the exposure intensity distributions;
    obtaining a comparison value of either an inclination of an approximation linear line or an area average from a unit comprising a succession of two or more of the attributes;
    setting prescribed light emitting quantities to the light emitting elements extending over an entire valid image region so as to enable the comparison values to fall within a prescribed range to suppress density unevenness to a predetermined amount; and
    driving said light emitting elements in accordance with the prescribed light emitting quantities.

22. An optical writing unit inspecting apparatus for inspecting either an optical writing unit including a plurality of light emitting elements or an imaging element array, said optical writing unit inspecting apparatus comprising:
    an exposure light intensity detecting device configured to detect an exposure intensity distribution from light spots;
    an attribute finding device configured to find a prescribed attribute from each exposure intensity distribution; and
    a comparison value obtaining device configured to obtain a comparison value for a measurement point from a unit comprising a succession of two or more of the attributes;
    wherein the optical writing unit is inspected if a plurality of said comparison values for the entire exposure valid region falls within the prescribed range.

23. An image forming apparatus, comprising:
    means for emitting light beams in accordance with a correction value, said light emitting means including a plurality of light emitting elements;
    means for imaging with the light beams on a prescribed plane to form an image;
    means for determining the correction value;
    means for detecting and forming exposure intensity distributions of each emission of the light beams;
    means for obtaining a prescribed attribute from each exposure intensity distribution; and
    means for obtaining a plurality of comparison values from a plurality of different units each composed of successive ones of the attributes;
    wherein said correction value is determined so that said plurality of comparison values fall within a prescribed range to suppress density unevenness of the image to a predetermined amount.

24. A computer program product which stores computer program instructions for execution by a computer to produce an image forming operation, comprising the steps of:
    emitting a light beam from a light element array;
    imaging the light beam with an imaging element array;
    obtaining a three dimensional exposure intensity distribution for each light emitting element of the light element array;
    obtaining a prescribed attribute for each of the exposure intensity distributions;
    obtaining a comparison value of either an inclination of an approximation linear line or an area average from a unit comprising a succession of two or more of the attributes;
    setting prescribed light emitting quantities to the light emitting elements extending over an entire valid image region so that the comparison value falls within a prescribed range and to suppress density unevenness to a predetermined amount; and
    driving all of the light emitting elements in accordance with the prescribed light emitting quantities.

25. An optical writing unit, comprising:
    a light emitting array having a plurality of light emitting elements configured to emit light beams;
    an imaging element array configured to perform imaging with the light beams on a prescribed plane; and
    an exposure intensity distribution detecting device configured to detect a three dimensional exposure intensity distribution for each of the light beams;
    an attribute obtaining device configured to obtain a prescribed attribute from each of the exposure intensity distributions; and
    a comparison value obtaining device configured to obtain a comparison value from a unit comprising a succession of two or more of the attributes;
    wherein said light beams are emitted so that the comparison values for an entire exposure valid region fall within a prescribed range.

* * * * *